US012596679B2

(12) United States Patent
Wang et al.

(10) Patent No.: US 12,596,679 B2
(45) Date of Patent: Apr. 7, 2026

(54) METHOD AND APPARATUS PROVIDING A TIERED ELASTIC CLOUD STORAGE TO INCREASE DATA RESILIENCY

(71) Applicant: Intel Corporation, Santa Clara, CA (US)

(72) Inventors: Ren Wang, Portland, OR (US); Christian Maciocco, Portland, OR (US); Kshitij Doshi, Tempe, AZ (US); Francesc Guim Bernat, Barcelona (ES); Ned Smith, Beaverton, OR (US); Satish Jha, Portland, OR (US); Vesh Raj Sharma Banjade, Portland, OR (US); S M Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 17/521,630

(22) Filed: Nov. 8, 2021

(65) Prior Publication Data

US 2022/0138156 A1 May 5, 2022

(51) Int. Cl.
G06F 7/00 (2006.01)
G06F 16/00 (2019.01)
(Continued)

(52) U.S. Cl.
CPC .............. G06F 16/16 (2019.01); G06F 16/13 (2019.01); G06F 16/183 (2019.01)

(58) Field of Classification Search
None
See application file for complete search history.

(56) References Cited

U.S. PATENT DOCUMENTS

2013/0311986 A1* 11/2013 Arrouye ................... G06F 8/61
717/175
2016/0124665 A1 5/2016 Jain
(Continued)

FOREIGN PATENT DOCUMENTS

EP 3409044 A1 12/2018

OTHER PUBLICATIONS

European Patent Office, "European Search Report," issued in connection with European Patent Application No. 22200518.3, dated Mar. 24, 2023, 11 pages.
(Continued)

*Primary Examiner* — Tuan A Pham
(74) *Attorney, Agent, or Firm* — Hanley, Flight & Zimmerman, LLC

(57) ABSTRACT

Methods, apparatus, systems, and articles of manufacture providing a tiered elastic cloud storage to increase data resiliency are disclosed. An example instructions cause one or more processors to at least execute the instructions to: generate a storage scheme for files based on a categorization of the files and resource capabilities of an edge-based device and a cloud-based device, the categorization including a first group of files to be stored locally at an end user computing device, a second group of files to be stored externally at the edge-based device, and a third group of files to be stored externally at the cloud-based device; in response to an acknowledgement from at least one of the edge-based device or the cloud-based device, generate a map corresponding to locations of the files; store the first group of files in local storage; and cause transmission of the second group of files to the edge-based device and the third group of files to the cloud-based device.

23 Claims, 19 Drawing Sheets

(51) Int. Cl.
  *G06F 16/13*   (2019.01)
  *G06F 16/16*   (2019.01)
  *G06F 16/182*  (2019.01)

(56)      References Cited

U.S. PATENT DOCUMENTS

| | | | | |
|---|---|---|---|---|
| 2020/0097274 | A1* | 3/2020 | Sarkar | G06F 8/63 |
| 2020/0136920 | A1* | 4/2020 | Doshi | H04L 41/16 |
| 2021/0263667 | A1* | 8/2021 | Whitlock | G06F 11/3447 |
| 2021/0303522 | A1* | 9/2021 | Periyagaram | G06F 16/178 |

OTHER PUBLICATIONS

European Patent Office, "Decision to Grant," issued in connection with European Patent Application No. 22200518.3, dated Oct. 10, 2024, 1 page.
European Patent Office, "Intent to Grant," issued in connection with European Patent Application No. 22200518.3, dated May 31, 2024, 206 pagse.

* cited by examiner

METHOD AND APPARATUS PROVIDING A TIERED ELASTIC CLOUD STORAGE TO INCREASE DATA RESILIENCY

FIELD OF THE DISCLOSURE

This disclosure relates generally to computing devices, and, more particularly, to methods and apparatus providing a tiered elastic cloud storage to increase data resiliency.

BACKGROUND

Edge network environments (e.g., an Edge, Fog, multi-access edge computing (MEC), private/enterprise or Internet of Things (IoT) network) enable a workload execution (e.g., an execution of one or more computing tasks, an execution of a machine learning model using input data, etc.) near endpoint devices that request an execution of the workload. Edge network environments may include infrastructure, such as an edge service, that is connected to cloud infrastructure, endpoint devices, or additional edge infrastructure via networks such as the Internet. Edge services may be closer in proximity to endpoint devices than cloud infrastructure, such as centralized servers.

BRIEF DESCRIPTION OF THE DRAWINGS

The figures are not to scale. In general, the same reference numbers will be used throughout the drawing(s) and accompanying written description to refer to the same or like parts.

Figure 1:
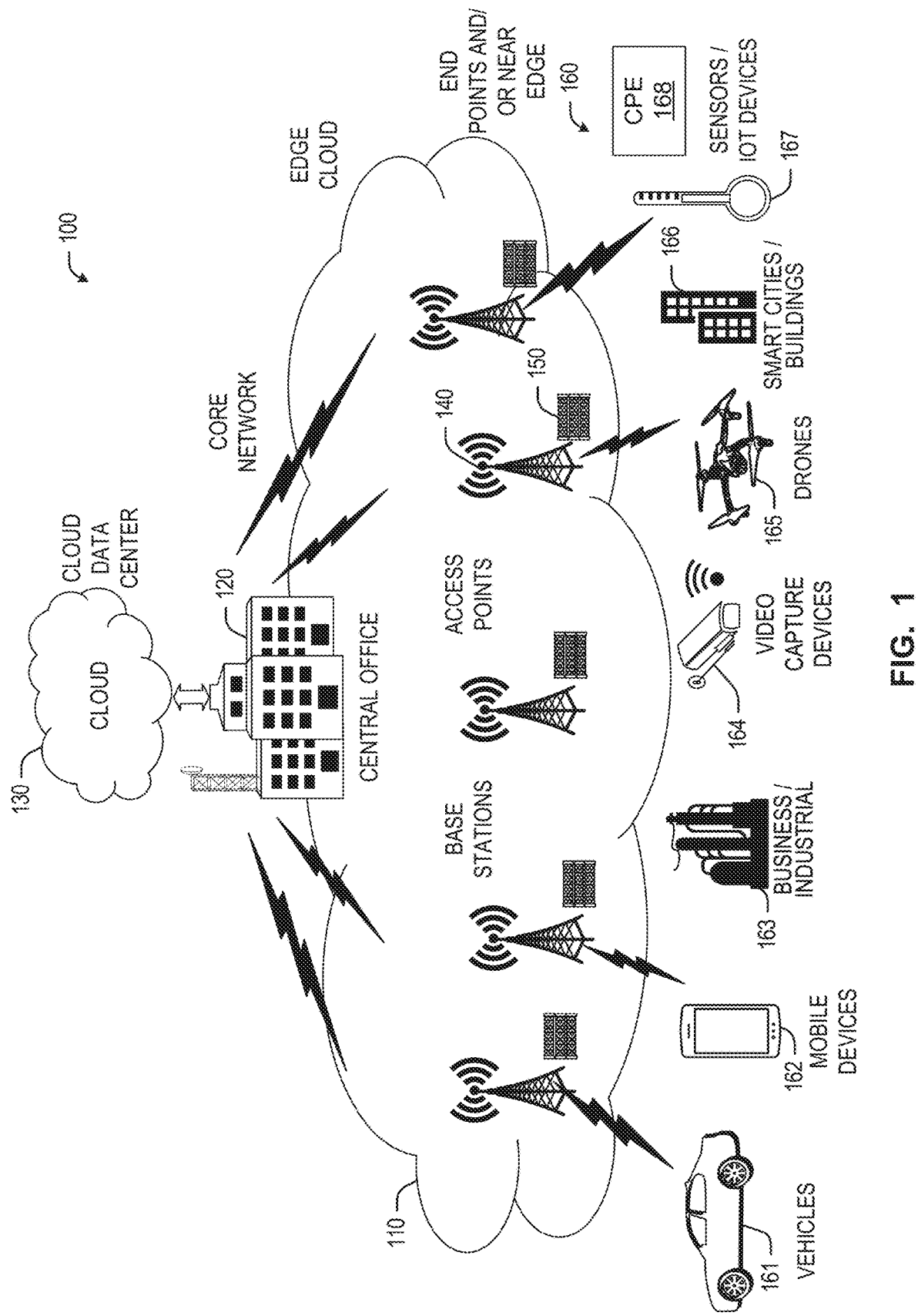
FIG. 1 illustrates an overview of an edge cloud configuration for edge computing.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud storage has gained great popularity in recent years to compensate the limited local storage while storage demands and performance of applications increase. The performance and ease-of-use of cloud storage has been improved to allow users to access a single storage service and reduce access time via intelligent local caching. However, cloud-based storage corresponds to long latency because the data center could be thousands of miles away from the device. Additionally, cloud-based storage may correspond to varying network conditions (e.g., due to congestion and potential bad path conditions), that may result in (a) a miss at the local storage (e.g., because an access pattern cannot be totally predicted) and/or (b) long response time which impacts the user experience.

Examples disclosed herein include a multi-tiered elastic cloud storage architecture which takes advantage of the end user device, the edge cloud, and the data center cloud. The multi-tiered cloud storage architecture includes at least three tiers: local storage at the end user device, additional storage on the edge cloud, and large storage at the cloud back-end. Local storage on the device may include the local storage embedded in the end user device (e.g., a mobile device, a laptop, a tablet, a computer, an internet of things (IoT) device, etc.) such as NAND flash, PCM drives, SSD/HDD drives, etc. Such device storage provides fast access time, but has limited capacity.

Edge storage on edge cloud devices includes larger storage than the local storage. The edge storage resides in the edge servers which are closer to end user devices than the cloud backend. Edge devices can provide a shared scalable storage to nearby end user devices. There are many ways to physically deploy the edge storage servers, such as deploying edge servers that co-exist with the base station, home servers/routers, deploying servers in a vehicle, etc. In some examples, such edge devices can use the same cloud storage service interface to connect and provide services to the users. In some examples, due to the closeness of the edge devices to the end user devices, edge storage at the edge devices can deliver a better user experience. Edge storage at edge device may also provide the capability to duplicate stored data on many edges devices to provide various level of resiliency.

Cloud storage in back-end Internet cloud is larger than the edge storage on the edge cloud. Various cloud services, especially storage services, have developed in the past few years to provide almost unlimited storage with very low cost. There are several advantages for cloud storage at the backend Internet cloud. Besides the almost unlimited capacity, cloud-based storage is always-on and can share storage for multiple devices of end users. However, depending on the networking conditions and interface overhead, the cloud storage latency could be milli-seconds to even seconds, which may negatively impact the user experience.

Examples disclosed herein provide better access latency, better data resiliency, and faster recovery/restart upon network or device failures by storing data locally and/or throughout the edge and/or cloud based on the parameters of the data (e.g., importance of the data, how often the data is accessed, speed at which the data is needed, size of the data, etc.). Examples disclosed herein result in improved performance and user experience. In some examples, the stored data can correspond to priority/performance/resilience attributes so that data with particular attributes (e.g., a higher resiliency requirement) is duplicated by the infrastructure in the proper storage. Examples disclosed herein allows end devices to access edge storage directly with low latency, unless the edge storage is not available (during mobility for example). When edge storage is not available, the end device can access the back-end cloud storage seamlessly to guarantee an un-interrupted service.

FIG. 1 is a block diagram 100 showing an overview of a configuration for edge computing, which includes a layer of processing referred to in many of the following examples as an "edge cloud." As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources and/or end points 160 (e.g., autonomous vehicles 161, user equipment 162, business and industrial equipment 163, video capture devices 164, drones 165, smart cities and building devices 166, sensors and IoT devices 167, Consumer/Customer Presence Equipment 168, etc.) than the cloud data center 130. The Consumer/Customer Presence Equipment 168 may include a gateway or home edge device. In some examples, the mobile device 162, the vehicle 161, the IoT devices 167, a home computing device, etc. may connect with the CPE 168. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits. In some examples, the end points 160 may be included in the edge cloud 110 as part of a near edge of the edge cloud 110.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "device edge," "near edge", "close edge", "local edge", "middle edge", "user device edge," or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
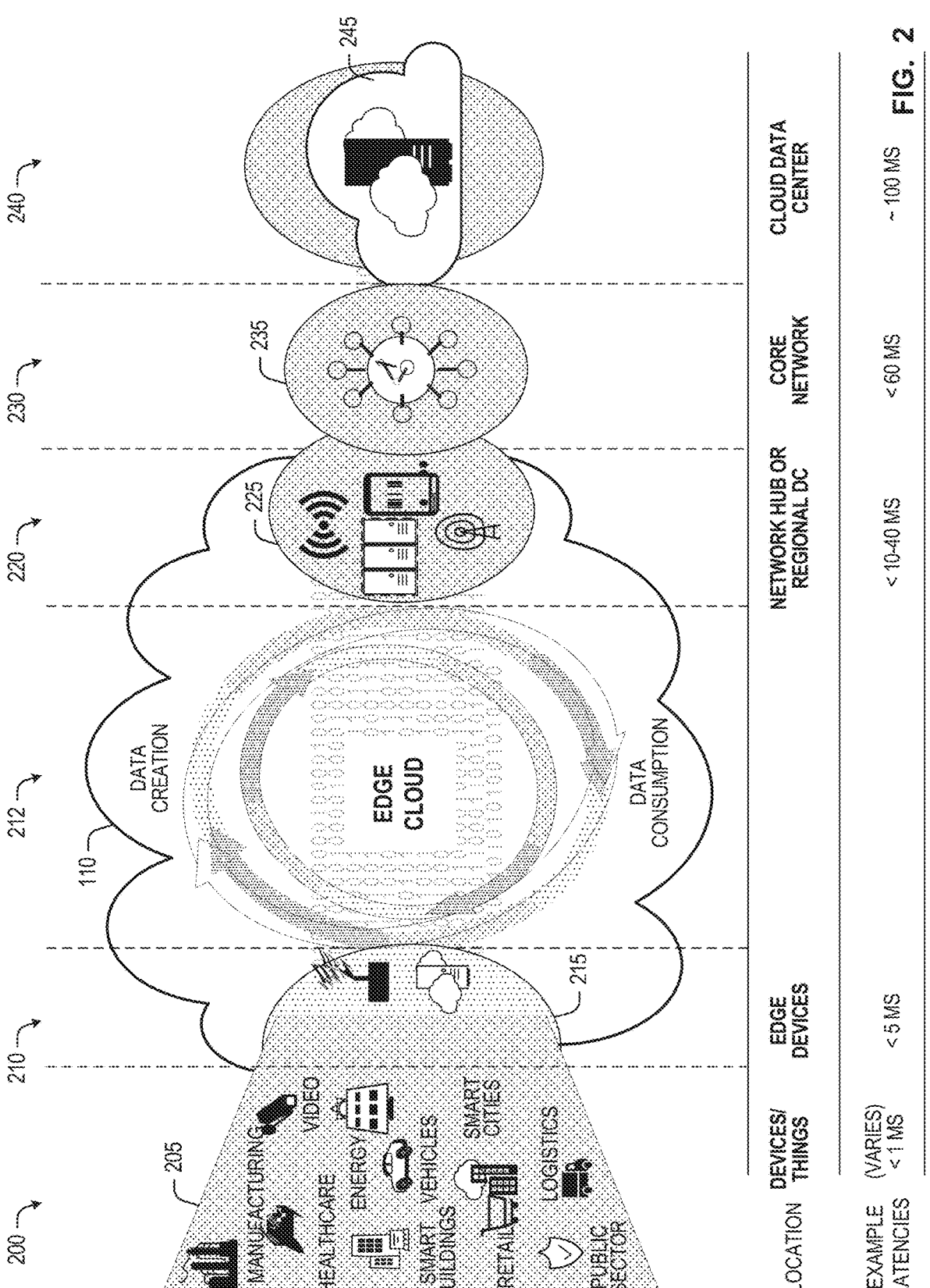
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "device edge", "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. Additionally or alternatively, the edge cloud 110 may be a home network that is connected to the edge could via a FIOS link or a cable network. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 4G/5G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, set up, home gateway, client work station, client mobile personal computer (PC), smart phone, and/or any other type of computing devices. For example, the edge cloud 110 may be an appliance computing device that is a self-contained processing system including a housing, case, or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 13B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
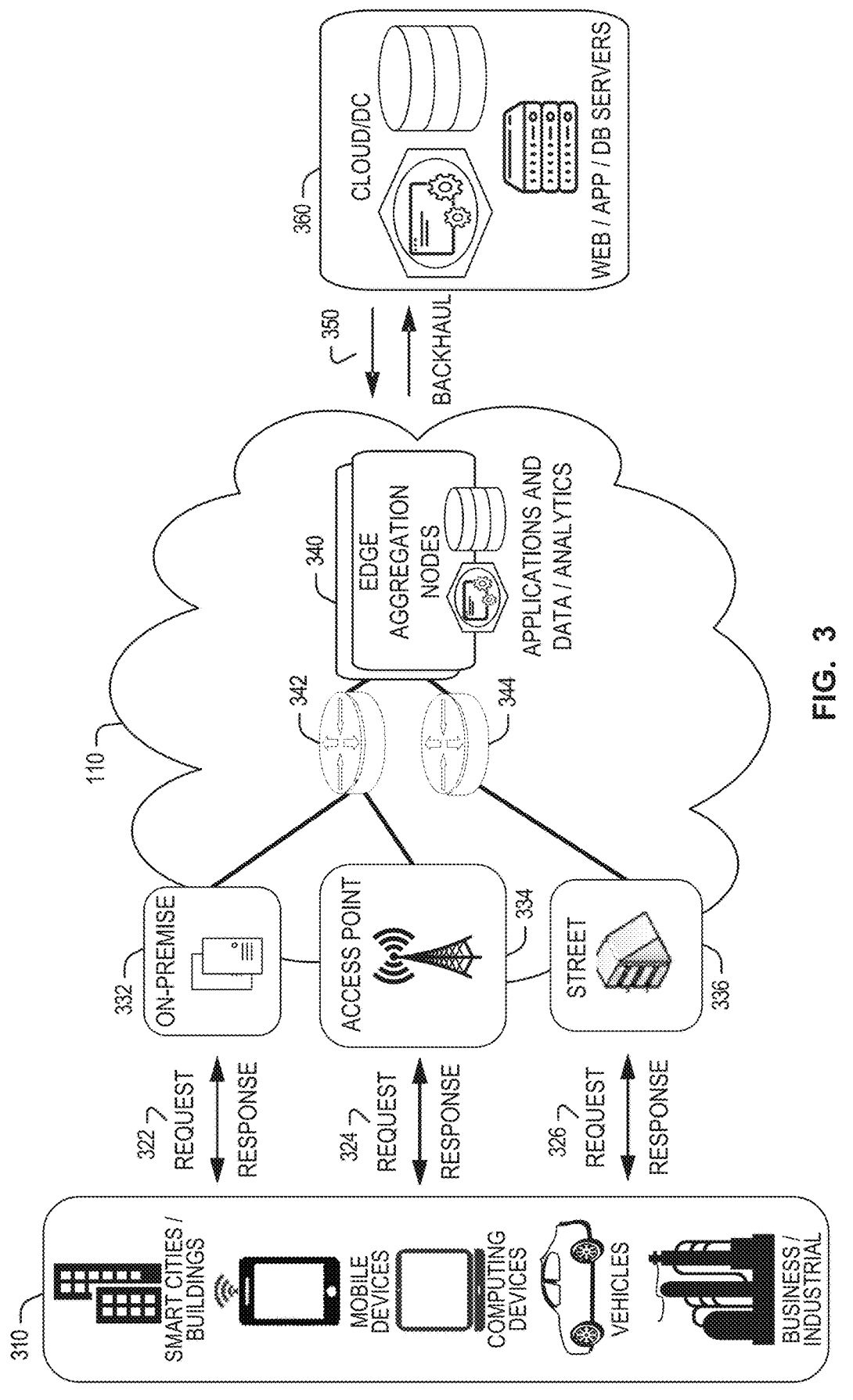
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment) exchange requests and responses with the example edge cloud 110. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
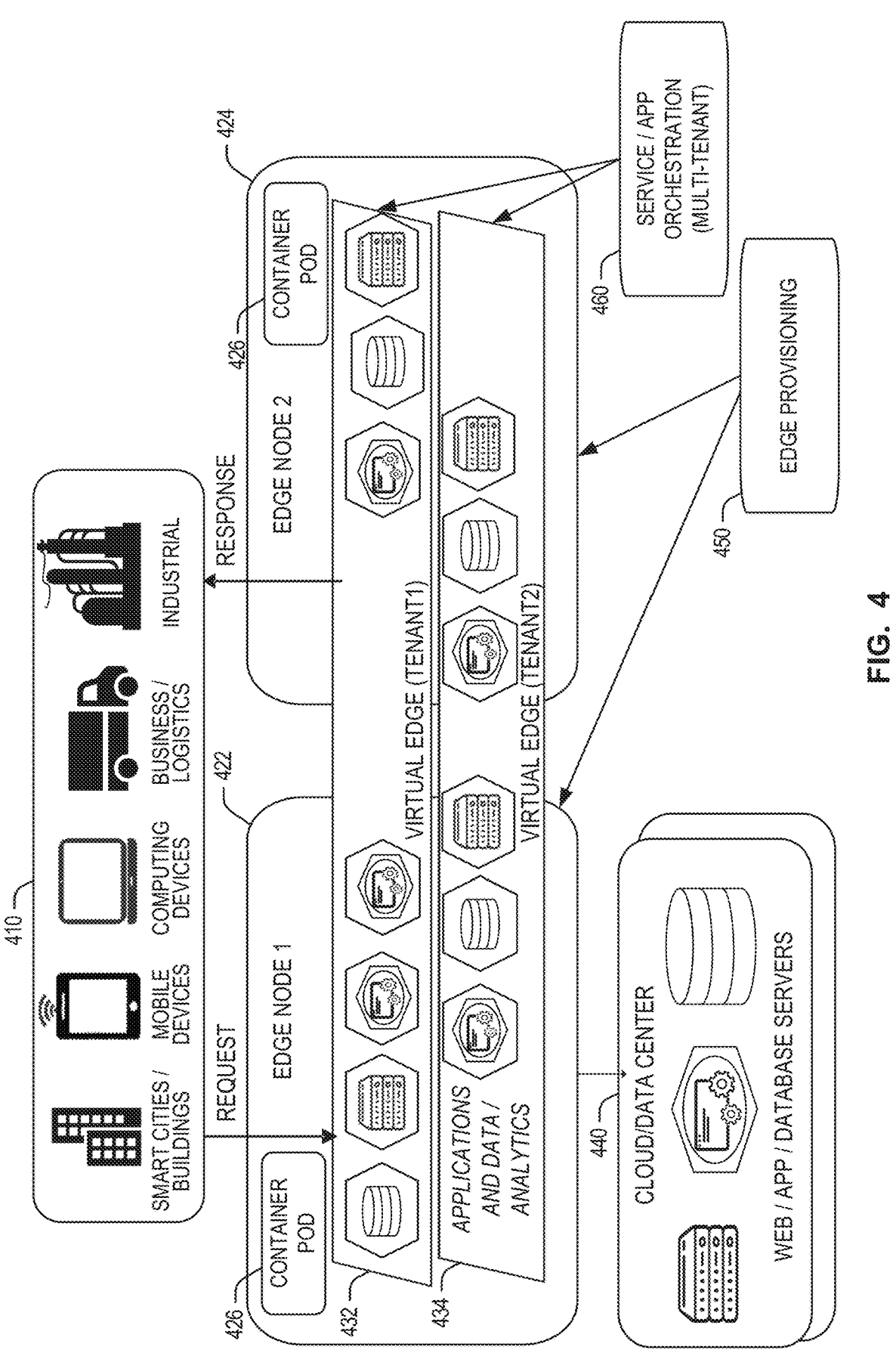
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
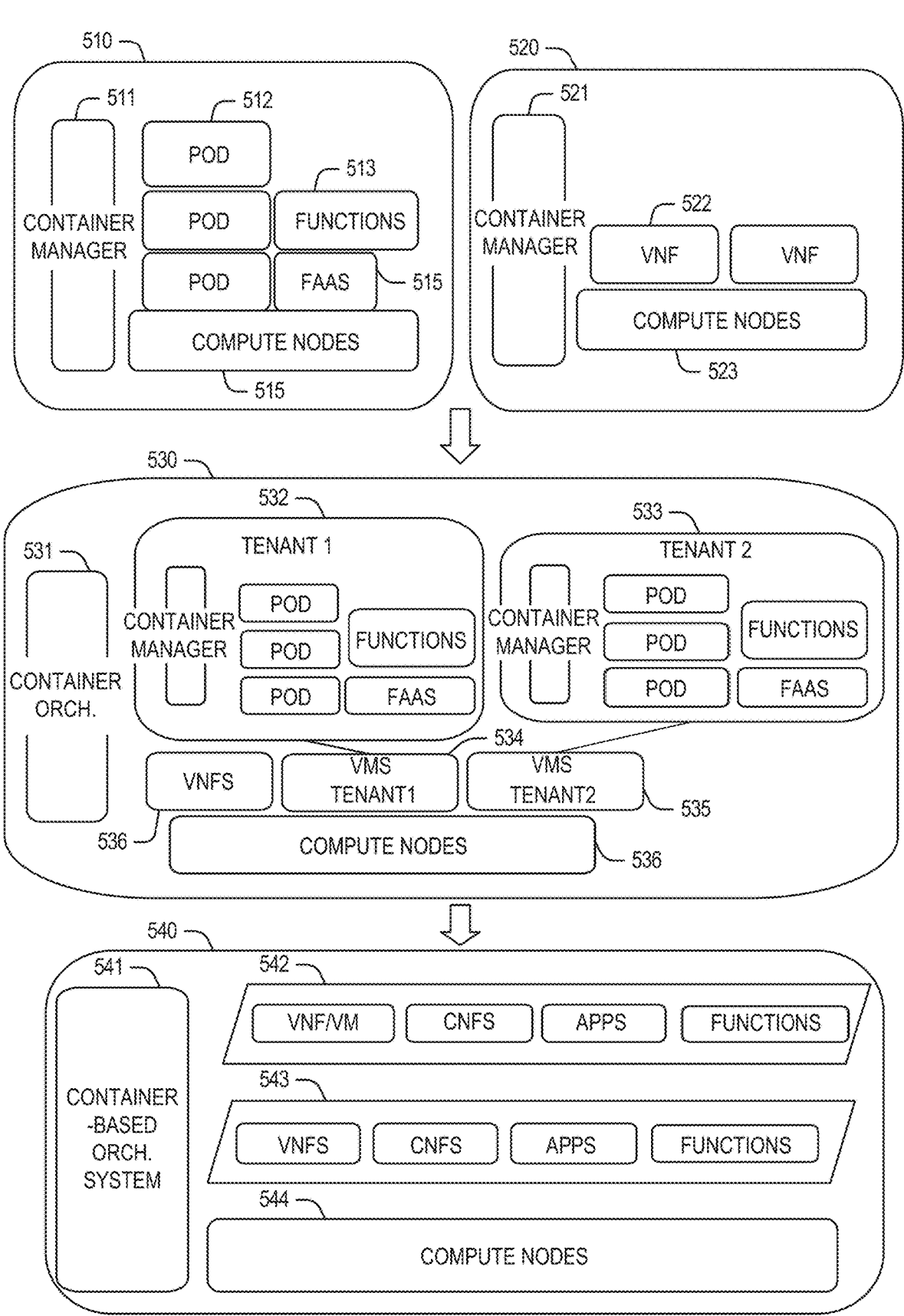
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
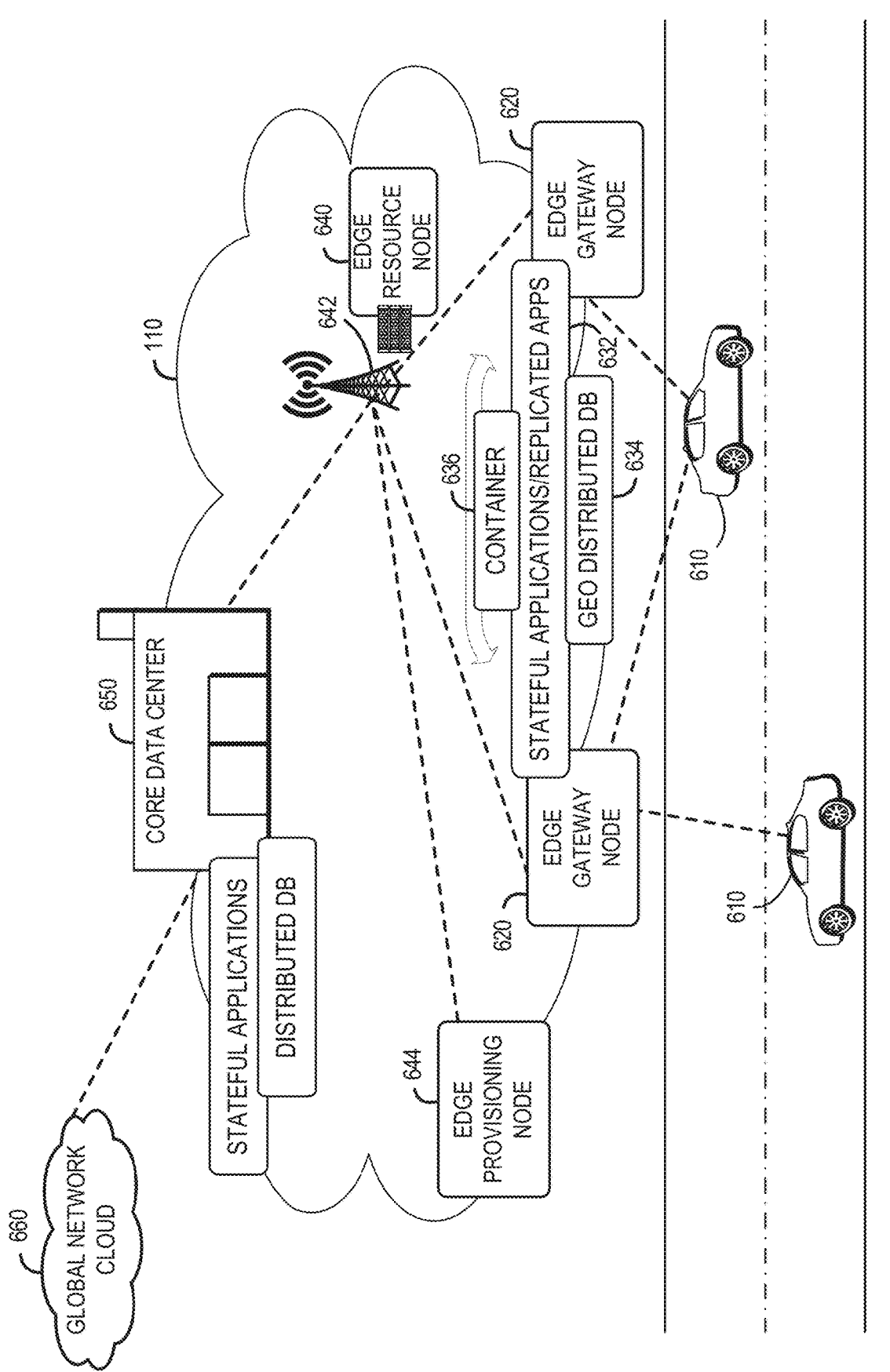
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. 1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s)

640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 1382 of FIG. 13B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 1382 of FIG. 13B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 1382 of FIG. 13B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1382 from the edge provisioning node 644. For example, the software instructions, which may correspond to the example computer readable instructions 1382 of FIG. 13B, may be downloaded to the example processor platform/s, which is to execute the computer readable instructions 1382 to implement the methods described herein.

In some examples, the processor platform(s) that execute the computer readable instructions 1382 can be physically located in different geographic locations, legal jurisdictions, etc. In some examples, one or more servers of the edge provisioning node 644 periodically offer, transmit, and/or force updates to the software instructions (e.g., the example computer readable instructions 1382 of FIG. 13B) to ensure improvements, patches, updates, etc. are distributed and applied to the software instructions implemented at the end user devices. In some examples, different components of the computer readable instructions 1382 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 13A and 13B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7:
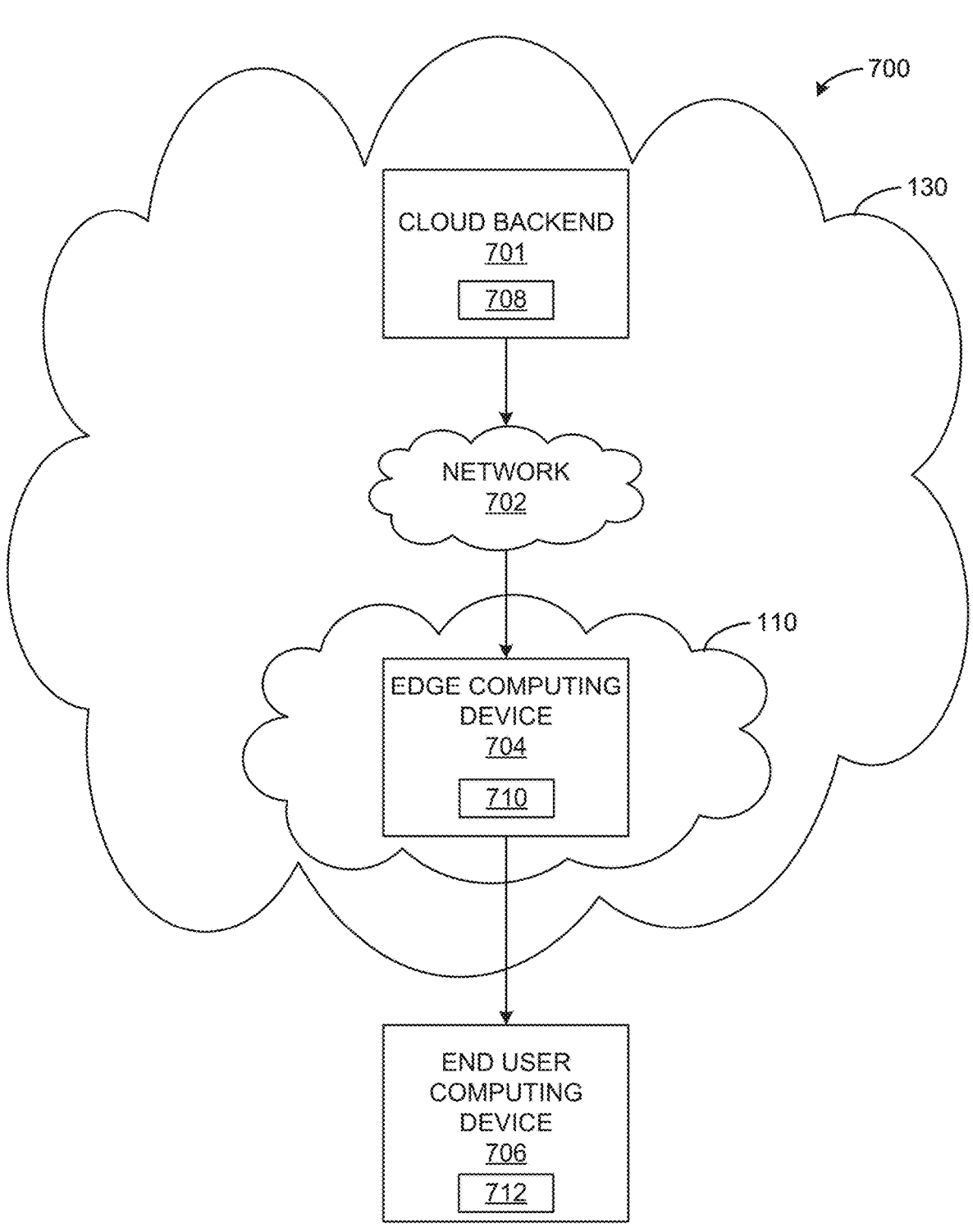
FIG. 7 is a block diagram of an example system described in conjunction with examples disclosed herein to facilitate a multi-tier storage system.

FIG. 7 is a block diagram of an example environment 700 corresponding to a multi-tiered storage scheme. The example environment 700 includes the example edge cloud 110 and the example cloud/data center 130 of FIGS. 1, 2, 3, and/or 6 and an example backend 701, an example network 702, edge computing device 704, an example end user computing device 706, an example cloud storage 708, an example edge storage 710, and an example device storage 712 (e.g., also referred to as an end user computing device storage). Although the example of FIG. 7 corresponds to a cloud-based network, examples disclosed herein can be applied to any type of computing environment (e.g., virtual machines, racks of servers, etc.) and can be deployed anywhere between and/or including the end user computing device 706 up to the cloud backend 130 (e.g., between any device (e.g., the cloud backend 701 and/or the computing device(s) 704, 706) or within any path inside the network 702). In some examples, the cloud/data center 130 corresponds to the cloud/data center 360, 440 of FIGS. 3 and/or 4 and/or the global network cloud 660 of FIG. 6. The example end user computing device 706 may correspond to one or more of the example end points 160 of FIG. 1. Additionally, the example edge computing device 704 may correspond to the example edge nodes 422, 424, 620, 644 of FIGS. 4 and/or 6. Although the example of FIG. 1 includes one cloud backend 701, one edge computing device 704, and one end user computing device 706, there may be any number of clouds, edge computing devices and/or end user computing devices.

The example cloud backend 701 of FIG. 7 is a computing device that interfaces with the example edge computing device 704 to monitor and/or facilitate operation of connected devices. The example cloud-based server 130 may be implemented in a private cloud and/or a public cloud. In some examples, the cloud backend 701 is a server that implements and manages virtual machines or servers in a rack. The example cloud backend 701 includes the example cloud storage 708 to store data obtained from the example end user computing device 706 via the network 702. To facilitate the storage of data, the example cloud backend 701 may obtain messages and reply to the messages with acknowledgements. The example cloud backend 701 is further described below in conjunction with FIG. 8B.

The example network 702 of FIG. 7 is a system of interconnected systems exchanging data between the cloud backend 701 and processing devices (e.g., the example edge computing device 704). The example network 702 may be implemented using any type of public or private network such as, but not limited to, the Internet, a telephone network, a local area network (LAN), a cable network, and/or a wireless network. To enable communication via the example network 702, the cloud backend 701 and/or the computing devices 704, 706 include(s) a communication interface that enables a connection to an Ethernet, a digital subscriber line (DSL), a telephone line, a coaxial cable, any wireless connection, etc.

The exampled edge 110 of FIG. 7 includes the example edge computing device 704. Although the example of FIG. 7 includes the example the edge 110, FIG. 7 may be described in conjunction with a fog domain, and IoT domain, a virtual machine (VM) domain, a multi-access edge computing (MEC) domain, etc. The example edge computing device 704 is a device that operates within the example edge 110. The edge computing device 704 may be a server, a broker, an orchestrator, a fog device, a virtual machine, and/or any other type of computing device operating in an environment between the cloud backend 701 and the end user computing device 706. The example edge computing device 704 may include the example edge storage 710 to store data (e.g. including data, files, packets, etc.) from the example end user computing device 706. In some examples, the edge computing device 704 can communicate with other edge computing devices and/or edge servers to facilitate transfer of data when the end user computing device 706 is mobile. The edge computing device 704 is further described below in conjunction with FIG. 8B.

The example end user computing device 706 of FIG. 7 is a device (e.g., a mobile device, a camera, a drone, a smart device, a sensor, a server, a computer, a IoT device, and/or any other computing device) that interfaces with the edge computing device 704 and/or the example cloud backend 701 to access services (e.g., storage) provided by the edge computing device 704 and/or the cloud backend 701. For example, the end user computing device 706 can instruct the edge computing device 704, the cloud backend 701, and/or anywhere within the network along the path corresponding to network 702 to store data instead of storing the data locally at the example device storage 712. The example edge computing device 704 determines which data to keep locally, which data to send to the edge storage 710 and/or which data to send to the cloud storage 708 based on parameters of the data and/or the capability and/or capacity of the edge device 704 and/or the cloud backend 701. The example end user computing device 706 is further described below in conjunction with FIG. 8A.

Figure 8A:
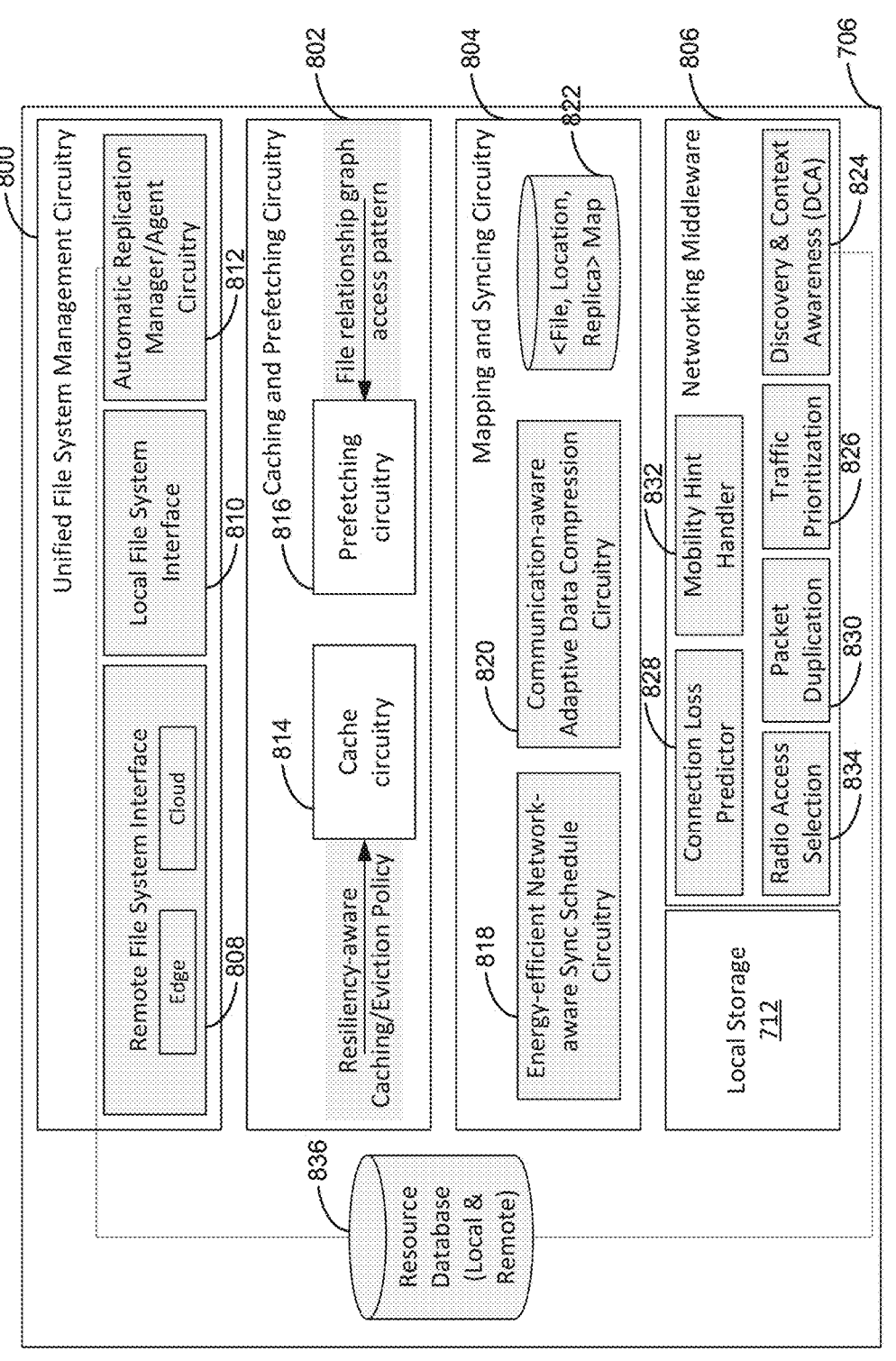
FIGS. 8A and/or 8B illustrate block diagrams of example implementations of the end user computing device, the edge computing device, and the cloud backend of FIG. 7.

FIG. 8A illustrates a block diagram of an example implementation of the example end user computing device 706 of FIG. 7. The example end user computing device 706 includes example unified file system management circuitry 800, example caching and prefetching circuitry 802, example mapping and syncing circuitry 804, example networking middleware 806, an example resource database 836, and the example local storage 712 of FIG. 7. The example unified file system management circuitry 800 includes an example remote file system interface 808, an example local system interface 810, and example automatic replication manager/agent circuitry 812. The example caching and perfecting circuitry 802 includes an example cache circuitry 814 and example prefetching circuitry 816. The example mapping and synching circuitry 804 includes example energy-efficient network aware sync schedule circuitry 818, example communication-aware adaptive data compression circuitry 820, and an example map storage 822. The example networking middleware 806 includes example discovery and context awareness circuitry 824, example traffic prioritization circuitry 826, example connection loss circuitry 828, example packet duplication circuitry 830, example mobility hint handler circuitry 832, an example radio access election circuitry 834. In some examples, the components of FIG. 8A may be implemented in the edge computing device 704 and/or any other device. For example, because power may be limited at the end user computing device 706, the end user computing device 706 may transmit instructions to the edge computing device 704 (where power is less limited) to determine how the data should be distributed in the tiered storage system.

The example unified file system management circuitry 800 of FIG. 8A communicates with the other components of the end user computing system 706 and the edge computing device 704 and/or the cloud backend 701 to provide users with multi-tiered storage without having to request users to manually move the content to various storage media. For example, the unified file system management circuitry 800 includes the example remote file system interface 808 to interface with the edge computing device 704 and/or the cloud backend 701. The remote file system interface 808 may include a single interface to interface with both the edge computing device 704 and the cloud backend 701 or may include two or more interfaces to interface with the edge computing device 704 and/or the cloud backend 701. In some examples, the unified file system management circuitry 800 can replicate at will data based on the classification of the data. For example, the unified file system management circuitry 800 can replicate high priority or critical data across the various tiers to allow continued and resilient operation in the presence of network or device failures). The unified file system management circuitry 800 may include the automatic replication manager/agent circuitry 812 to identify data that correspond to a particular classification and determine that the data should be replicated.

The example caching and prefetching circuitry 802 of FIG. 8A shields the network latency and provide energy efficiency by caching files and/or data that is most likely to be used in the local storage 712. For example, the prefetching circuitry 816 can categorize, determine, and/or estimate which data and/or files is/are most likely to be used, which data and/or files are likely to be used (but less likely than the most likely to be used files), and which data and/or files are least likely to be used based on a file relationship graph access pattern and/or any other prefetching protocol. As further described below, the mostly likely to be used data and/or files are stored at the local storage 712 (e.g., the example cache circuitry 814 in the local storage 712), the likely to be used data and/or files are stored in the edge storage 710, and the least likely to be used data and/or files are stored in the cloud storage 708. In some examples, the caching and prefetching circuitry 802 uses information in the map stored in the example mapping storage 822 to determine how to categorize files and/or data for caching, evicting, and/or prefetching purposes. As further described below, the mapping storage 822 may include historical information related to how often and/or when a file and/or data was accessed and/or from where. For example, the example caching and prefetching circuitry 802 may use the historic data to determine which data to evict by selecting less relevant files (based on the historic data of the files). In another example, the caching and prefetching circuitry 802 may prefetch a first file (e.g., from storage on the cloud or the edge) when a second file is accessed when the caching and prefetching circuitry 802 determines that the first file is often accessed after a second file (e.g., based on the historic data of the first and second filed). If an application of the end user computing device 706 attempts to access data, the application will first attempt to access the file at the local storage 712. If the access misses (e.g., the data is not stored in the local storage 712), the unified file system management circuitry 800 transmits a request to access the data in the edge storage 710. If the request misses the edge storage 710, the request is sent to the cloud storage 708. If the estimates made by the prefetching circuitry 816 is inaccurate (e.g., files that were assumed to be most likely or least likely end up being in the wrong category), the policy can be updated and data can be evicted from a storage device to a different storage device corresponding to the updated policy. The prefetching and/or caching policy may assume an object-based file system because the policy can obtain better file/data characteristics. To improve resilient operation the cache circuitry 814 may cache the data labeled high priority or critical at the appropriate location to resume operation quickly if a failure happens. In some examples, the prefetching circuitry 816 and the cache circuitry 814 of FIG. 8A can consider multiple aspects (e.g., parameters) and/or historical data from the map to determine whether to evict and/or promote data from one storage device to another. The aspects may include access recency, access frequency, file size, application context information (e.g., performance preference data), data classification, data attributes, etc. Data classification and/or data attributes correspond to resiliency (e.g., data priority, critical level, or location association information).

The example mapping and syncing circuitry 804 stores a mapping (also referred to as a map) of where data is stored in the multi-tier system. For example, the mapping and syncing circuitry 802 includes the example map storage 822 that identifies files and/or data, where the data/file is stored, and whether or not the data/file is a replica. The mapping and syncing circuitry 804 may update the map based on changes to where the data and/or files are stored. In some examples, the mapping and syncing circuitry 804 stores information related to access of the files and/or data. For example, the mapping and syncing circuitry 804 may include information related to how many time and/or when data or a file has been accessed. In this manner, the map includes a history of the data in the tiered storage. After the mapping and syncing circuitry 804 stores the map in the example map storage 822, the map can be used in a later session. The mapping may also include information related to cache misses and/or whether or not a prefetch was successful for a particular file and/or date. As described above, the caching and prefetching circuitry 802 may use the map to decide the priority of files and/or the relationship of the files when making evicting and/or prefetching decision. In some examples, the mapping can be stored for later use for subsequent sessions as a default or fast deployment tiering scheme when the implementing device (e.g., the end user computing device 706) and/or another device is within the same proximity as when the map was first generated and/or last updated. Additionally or alternatively, the mapping can be stored and later used as a template for storage pool replication to improve the performance of storage pool creation. For example, the template could describe the replicant data, thereby avoiding starting from a default map and then rebuilding the previously built map based on the replicant data set. Replicant storage pools could be held as exact copies for redundancy and resiliency or could evolve into a specialized storage pool for the community of devices that the map serves.

Additionally, the mapping and syncing circuitry 804 includes the example energy-efficient network-aware sync schedule circuitry 818 to sync content when there are multiple copies of the same file on different media or when there are multiple devices that belong to the same user. The example energy-efficient network-aware sync schedule circuitry 818 may sync content while considering energy, networking conditions, resiliency, and/or performance. In some examples, the energy-efficient network-aware sync schedule circuitry 818 schedules the syncing activities when networking conditions are food and/or when another application is active so waking up a device from a lower power state can be avoided. The example communication-aware adaptive data compression circuitry 820 compresses data that is being synced to reduce the total amount of data that is communicated. In some examples, the communication-aware adaptive data compression circuitry 820 compresses data in real time, depending on the network conditions and file characteristics. In some examples, the communication-aware adaptive data compression circuitry 820 utilizes an adaptive policy to make compression decisions, which trade communication costs (e.g., to compress or decompress) for communication costs, thereby improving energy efficiency by 20-30%.

The example networking middleware 806 of FIG. 8A sits below an application running on the end user computing device 706 and interacts with the unified file system management circuitry 800 to discover resource and context information related to proximity so that the data/file can be stored into an appropriate node (e.g., nearby edge device or server, such as the edge computing device 704). Edge devices may have limited resources (both computing and storage) and run on a battery. Edge servers, on the other hand, may be connected to a stable power source but need to handle varying demand of storage requests from multiple nearby nodes. When the unified file system management circuitry 800 selects data to be stored in one of the nearby devices or servers, the management circuitry 800 considers multiple attributes such as priority/performance/resiliency requirements, location association of data, life span of usefulness of data, near real-time storage capacity of the candidate platform (device/edge), selection of Radio Access Technology or RAT (in case the devices supporting multiple RATs such as WiFi/DSRC/5G etc.), communication link capacity, available energy, etc. In some examples, one edge device/server may have large storage, however, the communication path to access the device may be congested, have low-capacity, or it have a single communication path to reach. In such examples, selection of such a device for storage may not be efficient and may not be good for network resiliency because there will be no alternate path if thr current communication path has an issue. Accordingly, the example networking middleware 806 may take responsibility of discovering such information and selects an edge node with suitable RAT or communication path. In this manner, the unified file system management circuitry 800 can avoid dealing with the dynamics of underlying networking technology.

The example networking middleware 806 of FIG. 8A includes the example discovery and context awareness (DCA) circuitry 824 to collect information about the local dynamic environment, communication history, topology, and route context information. The example DCA circuitry 824 may periodically exchange a discovery message including information on available energy, redundant communication paths, communication link quality, etc. In some examples, full discovery information may be shared by nodes with longer periodicity to make the discovery communication more efficient. For example, while incremental information (recently changed information) can be stored between consecutive full discovery sharing, the example DCA circuitry 824 may make the discovered information available to other components to access/use (e.g., the communication-aware adaptive data compression circuitry 820). In some examples, the DCA circuitry 824 obtains capacity information corresponding to workload characteristics, security level agreements, etc. corresponding to at least one of the edge computing device 704, the cloud backend 701, and itself (e.g., the end user computing device 706). The DCA circuitry 824 may obtain the workload characteristics and/or SLA may be obtained from one or more of the edge computing device 704, the cloud backend 701, and itself (e.g., the end user computing device 706) via a wired or wireless communication.

The example traffic prioritization circuitry 826 of the networking middleware 806 of FIG. 8A obtains hints (e.g., information) about the priority or importance of a particular storage request from applications. Additionally, the example traffic prioritization 826 interacts with the packet duplication circuitry 830 and other components to provide appropriate reliability treatment.

The example connection loss predictor circuitry 828 of the networking middleware 806 of FIG. 8A predicts the probability of a communication link or path loss. In some examples, the connection loss predictor circuitry 828 predicts the probability of the communication link or path loss using user defined rules or using an artificial intelligence (AI) based model (e.g., a machine learning model, a neural network, a deep learning model, etc.). When using an AI-based model, the AI model may be trained to predict communication link or path loss based on input characteristics of the communication. In this manner, the AI model can input network characteristics and output a probability of link or path loss based on the network characteristics. Additionally, the example connection loss predictor circuitry 828 switches to an alternative communication path while buffering in-flight packets in advance to avoid packet loss (e.g., when the probability of loss is above a threshold).

The example packet duplication circuitry 830 of the example networking middleware 806 of FIG. 8A decides potential duplication of data, files, and/or packets over multiple RATs based on the priority information. In this manner, the networking middleware 806 can provide various levels of resiliency for the data across the multi-tiered storage system. Additionally, the example packet duplication circuitry 830 may decide the number of repetitions of each packet on a RAT.

Figure 8B:
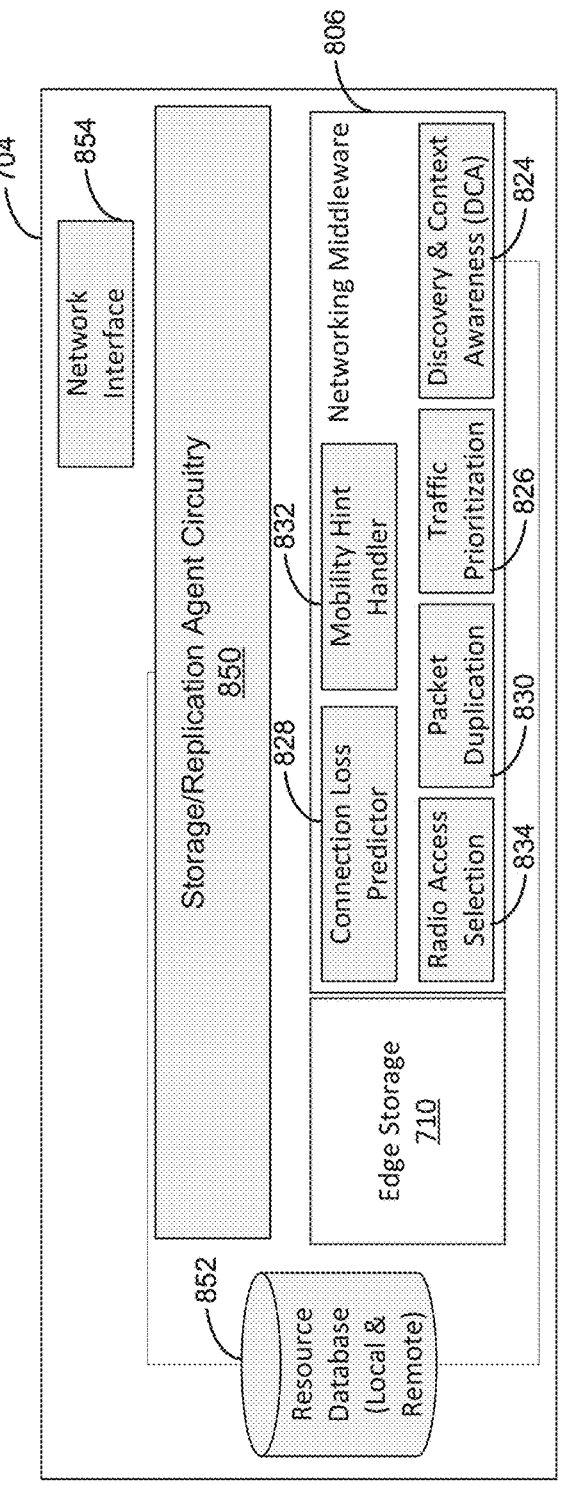

The example mobility hint handler circuitry 832 of the networking middleware 806 of FIG. 8A generates and/or obtains location information (e.g., GPS coordinates, speed, direction, etc.) when implemented in the user computing device 706. The mobility hint handler circuitry 832 transmits the location information to the example edge computing device 704. In this manner, the edge computing device 704 can make a determination as to whether to preemptively transmit stored data to another edge computing device or server that is or will be (based on the trajectory) closer to the end user computing device 706. When the mobility hint handler circuitry 832 is implemented in the example edge computing device 704 (as illustrated in FIG. 8B), the mobility hint handler circuitry 832 may determine the trajectory of the end user computing device 706 based on the location information obtained from the end user computing device 706. For example, the mobility hint handler circuitry 832 can determine the trajectory based on the current position, direction, and speed. If the example mobility hint handler circuitry 832 determines that the trajectory of the end user computing device 706 will result in the device being closer to a different edge computing device or server, the mobility hint handler circuitry 832 can facilitate the transition of the data from the edge computing device 704 to the different edge computing device or server corresponding to the trajectory.

The example radio access selection 834 of the networking middleware 806 of FIG. 8A determines which radio access technology to use for communications of the data, file and/or packet (e.g., Wi-Fi, dedicated short range communications (DSRC), 5G, etc.) based on application requirements, packet-level quality of service parameters, the likelihood of the RAT to be able to meet the requirements and/or parameters based on the bandwidth; reliability; latency; etc. of the RAT, free WiFi vs. paid subscription on cellular network, energy to transmit, etc.

The example resource database 836 of FIG. 8A stores information related to the available resources of the end user computing device 706, the edge computing device 704, and the cloud backend 701. For example, the resource database 836 may obtain the resources of the edge computing device 704 and/or the cloud backend 701 based on a response to a discovery message. The resources may correspond to storage level, energy level, link quality, etc. The example unified file system management circuitry 800 and/or the example networking middleware 806 uses the information when making data storage decisions.

Figure 8B:
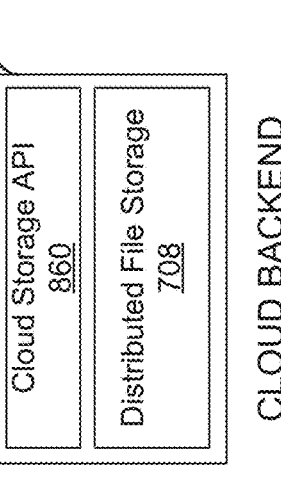

FIG. 8B illustrates a block diagram of an example implementation of the example cloud backend 701 and the example edge computing device 704 of FIG. 7. The edge computing device 704 includes an example storage/replication agent circuitry 850, an example resource database 852, an example network interface 854, the example discovery and context awareness circuitry 824, the example traffic prioritization circuitry 826, the example connection loss circuitry 828, the example packet duplication circuitry 830, the example mobility hint handler circuitry 832, and the example radio access election circuitry 834 of FIG. 8. In some examples, the components of FIG. 8A may be implemented in the edge computing device 704 and/or any other device. For example, because power may be limited at the end user computing device 706, the end user computing device 706 may transmit instructions to the edge computing device 704 (where power is less limited) to determine how the data should be distributed in the tiered storage system.

The example storage/replication agent circuitry 850 of FIG. 8B handles data replication while the example end user computing device 706 is mobile. For example, the storage/replication agent circuitry 850 on a server that stores data at an edge database for an end user device facilitates the transfer of the data to a second edge server when the mobility hint hander 832 determines that the end user computing device 706 is on a trajectory to be closer to the second edge server. After the data is sent to the second edge server for replication (e.g., via the network interface 854), the storage/replication agent circuitry 850 sends a map update (e.g., via the network interface 854) to the end user computing device 706 so that the end user computing device 706 can update the map in the map storage 822. The example storage/replication agent circuitry 850 may obtain and store the resources of itself and/or any other server in the resource database 852. In this manner, the edge computing device 704 can transmit the resource information to the end user computing device 706. Additionally, the example storage/replication agent circuitry 850 on a server that is within the trajectory obtains (e.g., via the network interface 854) the replicated data request from the original server and replies with an acknowledgement (e.g., via the network interface 854) corresponds to whether or not it can store the replicated data.

The example cloud backend 701 of FIG. 8B includes the example distributed file storage 708, which stores the data and/or files from the example end user computing device 706. Additionally, the example cloud backend 701 includes a cloud storage API 860 to facilitate the storage and access to data in the distributed file storage 708.

While an example manner of implementing the example end user computing device 706 and/or the example edge computing device 704 of FIG. 7 is illustrated in FIGS. 8A and/or 8B, one or more of the elements, processes and/or devices illustrated in FIGS. 8A and/or 8B may be combined, divided, re-arranged, omitted, eliminated and/or implemented in any other way. Further, the unified file system management circuitry 800, the example caching prefetching circuitry 802, the example mapping and synching circuitry 804, the example networking middleware 806, the example remote file system interface 808, the example local file system interface 810, the example automatic replication manager/agent circuitry 812, the example cache circuitry 814, the example prefetching circuitry 816, the example sync schedule circuitry 818, the example compression circuitry 820, the example DCA caricaturist 824, the example traffic prioritization circuitry 826, the example connection loss predictor circuitry 828, the example packet duplication circuitry 830, the example mobility hint handler circuitry 832, the example radio access selection 834, the example storage/replication agent circuitry 850, and/or the example network interface 854, and/or, more generally, the example end user computing device 706 and/or the example edge computing device 704 of FIGS. 8A and/or 8B may be implemented by hardware, software, firmware and/or any combination of hardware, software and/or firmware. Thus, for example, any of the example interception circuitry 800, the example domain adjustment circuitry 802, the example interface 804, the example workload execution circuitry 806, the example resource determination circuitry 80, the example interface 810, the example workload distribution circuitry 812, the example resource determination circuitry 814, and/or, more generally, the example end user computing device 706 and/or the example edge computing device 704 of FIGS. 8A and/or 8B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example end user computing device 706 and/or the example edge computing device 704 of FIGS. 8A and/or 8B is/are hereby expressly defined to include a non-transitory computer readable storage device or storage disk such as a memory, a digital versatile disk (DVD), a compact disk (CD), a Blu-ray disk, etc. including the software and/or firmware. Further still, the example end user computing device 706 and/or the edge computing device 704 of FIGS. 8A and/or 8B may include one or more elements, processes and/or devices in addition to, or instead of, those illustrated in FIGS. 8A and/or 8B, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
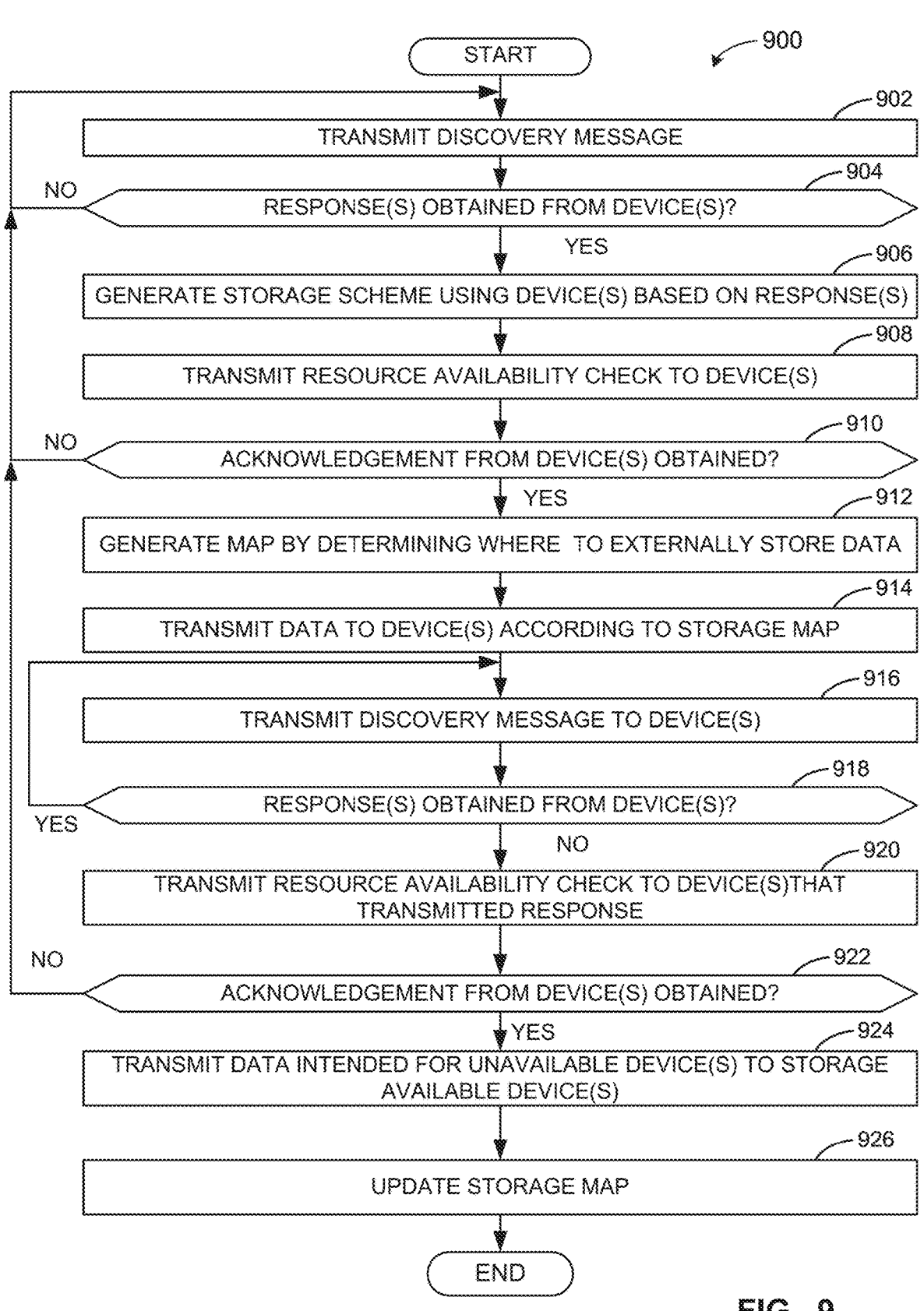
FIGS. 9 and 10 illustrate flowcharts representative of example machine readable instructions that may be executed to implement the end user computing device or the edge computing device of FIG. 7.
Figure 10:
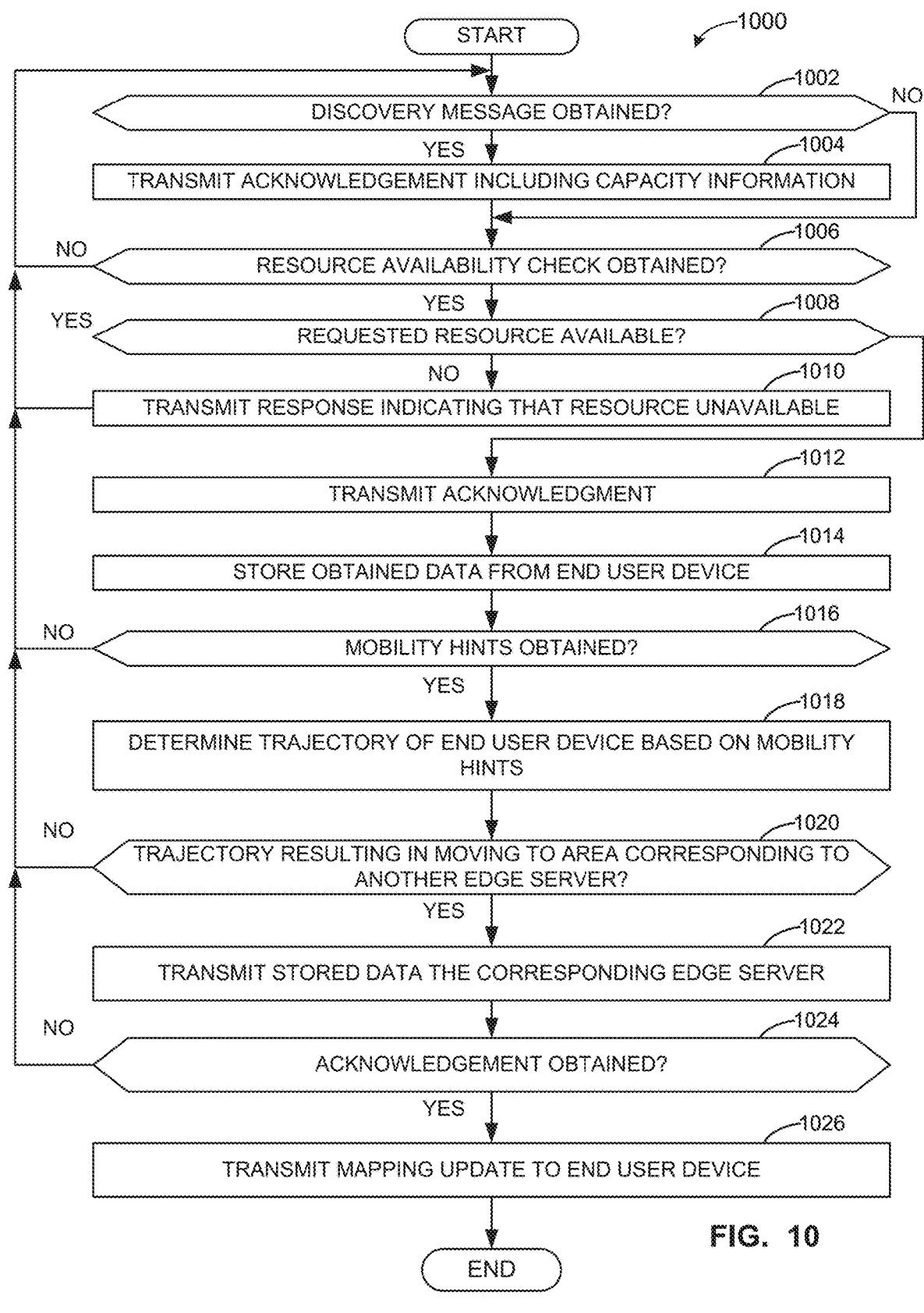

Flowcharts representative of example hardware logic, machine readable instructions, hardware implemented state machines, and/or any combination thereof for implementing the example end user computing device 706 and/or the example edge computing device 704 of FIGS. 8A and/or 8B are shown in FIGS. 9 and 10. The machine readable instructions may be one or more executable programs or portion(s) of one or more executable programs for execution by a computer processor such as the processor 1352 shown in the example processor platform within the computing device 1350 discussed below in connection with FIG. 13B. The programs may be embodied in software stored on a non-transitory computer readable storage medium such as a CD-ROM, a floppy disk, a hard drive, a DVD, a Blu-ray disk, or a memory associated with the processor 1352 but the entirety of the programs and/or parts thereof could alternatively be executed by a device other than the processor 1352 and/or embodied in firmware or dedicated hardware. Further, although the example program(s) is/are described with reference to the flowcharts illustrated in FIGS. 9 and/or 10, many other methods of implementing the example end user computing device 706 and/or the example edge computing device 704 of FIGS. 8A and/or 8B may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL), Windows, a shared object (SO), Linux), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example programs of FIGS. 9 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 illustrates a flowchart representative of example machine readable instructions 900 that may be executed to implement the end user computing device 706 of FIG. 8A. Although the flowchart of FIG. 9 is described in conjunction with the end user computing device 706 of FIGS. 7 and/or 8A, the example instructions may be used to implement other type(s) of computing devices(s) (e.g., virtual machines, servers, etc.), such as the edge computing device 704.

At block 902, the example remote file system interface 808 transmits discovery messages to edge devices (e.g., the example edge computing device 704) within range and to the example cloud backend 701. At block 904, the example discover and context awareness circuitry 824 determines if a response has been obtained from the device(s) via the remote file system interface 808. If the discovery and context awareness modules determine that one or more response(s) has not been obtained from one or more device(s) (block 904: NO), control returns to block 902.

If the discovery and context awareness modules determine that one or more response(s) has been obtained from one or more device(s) (block 904: YES), the example networking middleware 806 generates a storage schemes using the devices based on the responses (block 906). For example, the DCA circuitry 824 may generate a storage scheme based on a categorization of the files to be stored and capacity information of connected devices. The DCA circuitry 824 may determine the capacity of the edge computing device 704, the cloud backend 701, and itself (e.g., the end user computing device 706). In some examples, the capacity of the edge computing device 704, the cloud backend 701, and itself (e.g., the end user computing device 706) may be based on workload characteristics of the edge computing device 704, the cloud backend 701, and/or itself (e.g., the end user computing device 706), service level agreements (SLAs) of the edge computing device 704, the cloud backend 701, and/or itself (e.g., the end user computing device 706), etc. The workload characteristics and/or SLA may be obtained from one or more of the edge computing device 704, the cloud backend 701, and/or itself (e.g., the end user computing device 706) via a wired or wireless communication. Additionally or alternatively, the DCA circuitry 824 may use information from the caching and prefetching circuitry 802 to categorize data/files based on the likelihood of usage for the data/files that will be part of the storage scheme. Additionally or alternatively, the DCA circuitry 824 may use priority or importance information from the example traffic prioritization 826 when generate the storage scheme. Additionally or alternatively, the DCA circuitry 824 may use packet duplication information from the packet duplication circuitry 830 when generate the storage scheme. Additionally or alternatively, the DCA circuitry 824 may use packet duplication information from the automatic replication manager/agent circuitry 812 when generate the storage scheme to determine if and/or how high priority data is replaced across various tiers. Additionally or alternatively, the DCA circuitry 824 may resource information stored in the example resource database 836 to generate the storage scheme.

At block 908, the example transmit resource availability checks to the device(s). Although the resource availability may have been determined during discovery, the information may have since changed due to network dynamics and varying demand. Accordingly, a resource availability check is performed to verify that the device(s) are still able to handle the storage. At block 910, the example DCA circuitry 824 determines if acknowledgement(S) from the device(s) has/have been obtained via the remote system interface 808. If the DCA circuitry 824 determines that acknowledgement(s) has/have not been obtained (block 910: NO), control returns to block 902. If the DCA circuitry 824 determines that acknowledgement(s) has/have been obtained from the device(s) (block 910: YES), the example mapping and syncing circuitry 804 generates a map corresponding to the location of the data/files and/or whether the data/file are replicas (block 912) and stores the map the example map storage 822. In some examples, the map can be used for subsequent sessions as a default or fast deployment tiering scheme when the implementing device (e.g., the end user computing device 706) and/or another device is within the same proximity as when the map was first generated and/or last updated.

At block 914, the example remote file system interface 808 transmits the data/files to the corresponding device(s) according to the generated map. In some examples, the communication-aware adaptive data compression circuitry 820 may compress the data and/or file prior to transmitting. If any of the data is replicated in different locations, the example energy-efficient network aware sync schedule circuitry 818 may sync the data. In some examples, the radio access selection 834 selects the radio access technology to use to send the data and/or file. Additionally, the example end user computing device 706 stores the files that have been deemed most likely to be used in the local storage 712 based on the resource availability of the end user computing device 706 and the characteristics of the files.

After a threshold amount of time, the example remote file system interface 808 transmits a new discovery message to the device(s) that store the data and/or files (block 916). If the DCA circuitry 824 determines that a response has been obtained (block 918: YES), control returns to block 916 until another threshold amount of time occurs. If the DCA circuitry 824 determines that a response has not been obtained (block 918: NO), the example remote file system 808 transmits a resource availability check to another device(s) (e.g., another edge device, edge server, of the cloud backend 701) that did transmit a response (block 920). If the example DCA circuitry 824 determines that an acknowledgement was not obtained from the device(s) that previously transmitted a response (or the acknowledgement indicates that the device is no longer capable of handing the storage) (block 922: NO), control returns to block 902. If the example DCA circuitry 824 determines that an acknowledgement was obtained from the device(s) that previously transmitted a response (block 922: YES), the example remote file system interface 808 transmit the data indented for the device that did not send a response to the discovery message to the device(s) that transmitted the acknowledgement to the resource availability check (block 924). At block 926, the example mapping and syncing circuitry 804 updates the map stored in the example map storage 822 to indicate the updated location for the data. In some examples, the map can be used for subsequent sessions as a default or fast deployment tiering scheme when the implementing device (e.g., the end user computing device 706) and/or another device is within the same proximity as when the map was first generated and/or last updated.

FIG. 10 illustrates a flowchart representative of example machine readable instructions 1000 that may be executed to implement the end user computing device 706 of FIG. 8A.

Although the flowchart of FIG. 10 is described in conjunction with the end user computing device 706 of FIGS. 7 and/or 8A, the example instructions may be used to implement other type(s) of computing devices(s) (e.g., virtual machines, servers, etc.), such as the edge computing device 704.

At block 1002, the example storage/replication agent circuitry 850 determines if the example network interface 854 obtained a discovery message from the end user computing device 706. If the example storage/replication agent circuitry 850 determines that a discovery message has not been obtained (block 1002: NO), control continues to block 1006. If the example storage/replication agent circuitry 850 determines that a discovery message has not obtained (block 1002: YES), the example network interface 854 transmits an acknowledgement including the capacity information (e.g., stored in the example resource database 852 (block 1004).

At block 1006, the example storage/replication agent circuitry 850 determines if a resource availability check has been obtained from the end user computing device 706 via the network interface 854. If the example storage/replication agent circuitry 850 determines that the resource availability check has not been obtained (block 1006: NO), control returns to block 1002. If the example storage/replication agent circuitry 850 determines that the resource availability check has not been obtained (block 1006: YES), the example storage/replication agent circuitry 850 determines whether the requested resources (e.g., storage) is available (e.g., using the example resource database 852) (block 1008). If the example storage/replication agent circuitry 850 determines that the requested resource are not available (block 1008: NO), the example network interface 854 transmits a response indicating that the resources are not available (block 1010). In some examples, the edge computing device 704 does not send any response and the end user computing device 706 determines that the resource are not available because an acknowledgement is not obtained. If the example storage/replication agent circuitry 850 determines that the requested resource are available (block 1008: YES), the example network interface 854 transmits the acknowledgement that the resource are available (block 1012).

At block 1014, the example edge storage 710 stores obtained data form the end user device 706. If the data is compressed, the example storage/replication agent circuitry 850 may (or may not) decompress the data prior to storing in the edge storage 710. At block 1016, the example storage/replication agent circuitry 850 determines whether mobility hints (e.g., information such as location, speed, direction etc.) has been obtained from the example end user computing device 706. If the example storage/replication agent circuitry 850 determines that the mobility hints have not been obtained (block 1016: NO), control returns to block 1002. If the example storage/replication agent circuitry 850 determines that the mobility hints have been obtained (block 1016: YES), the example storage/replication agent circuitry 850 determines the trajectory of the end user device 706 based on the mobility hints (block 1018). For example, the storage/replication agent circuitry 850 may use the location, speed, and direction to determine when the end user device will be closer to a different edge computing device or server.

At block 1020, the example storage/replication agent circuitry 850 determines whether the trajectory will result in moving into an area closer to another edge server. If the example storage/replication agent circuitry 850 determines that the trajectory will not result in moving closer to another edge server (block 1020: NO), control returns to block 1002. If the example storage/replication agent circuitry 850 determines that the trajectory will result in moving closer to another edge server (block 1020: YES), the example storage/replication agent circuitry 850 instructs the network interface 854 to transmit stored data in the edge storage 710 from the end user computing device 706 to the other edge server (block 1022). If the other edge server does not have capacity, the other edge server may transmit a response that indicates that it does not have capacity to store the data or may not respond with an acknowledgement. If the other edge device does have capacity, the other edge device with response with an acknowledgement and store the data.

If the example storage/replication agent circuitry 850 determines that an acknowledgment from the other edge device was not obtained or indicated not enough resource sot store the data (block 1024: NO), control returns to block 1002. If the example storage/replication agent circuitry 850 determines that the acknowledgment from the other edge device was obtained (block 024: YES), the example network interface 854 transmit a mapping update to the end user device 706. In this manner, the example end use computing device 706 can update the map storage 822 accordingly.

Figure 11A:
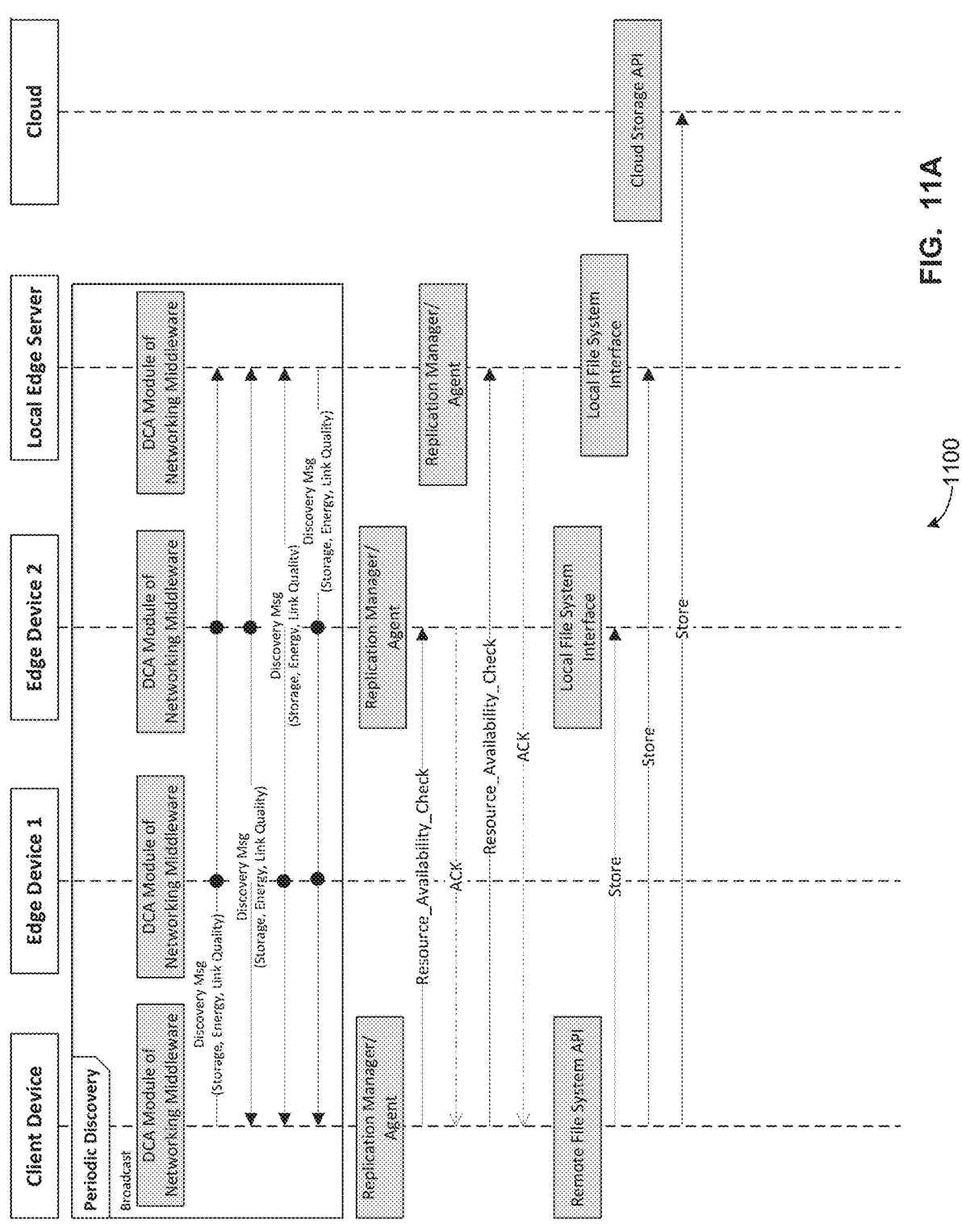
FIGS. 11A and 11B illustrate an example ping pong diagram described in conjunction with examples disclosed herein.
Figure 11B:
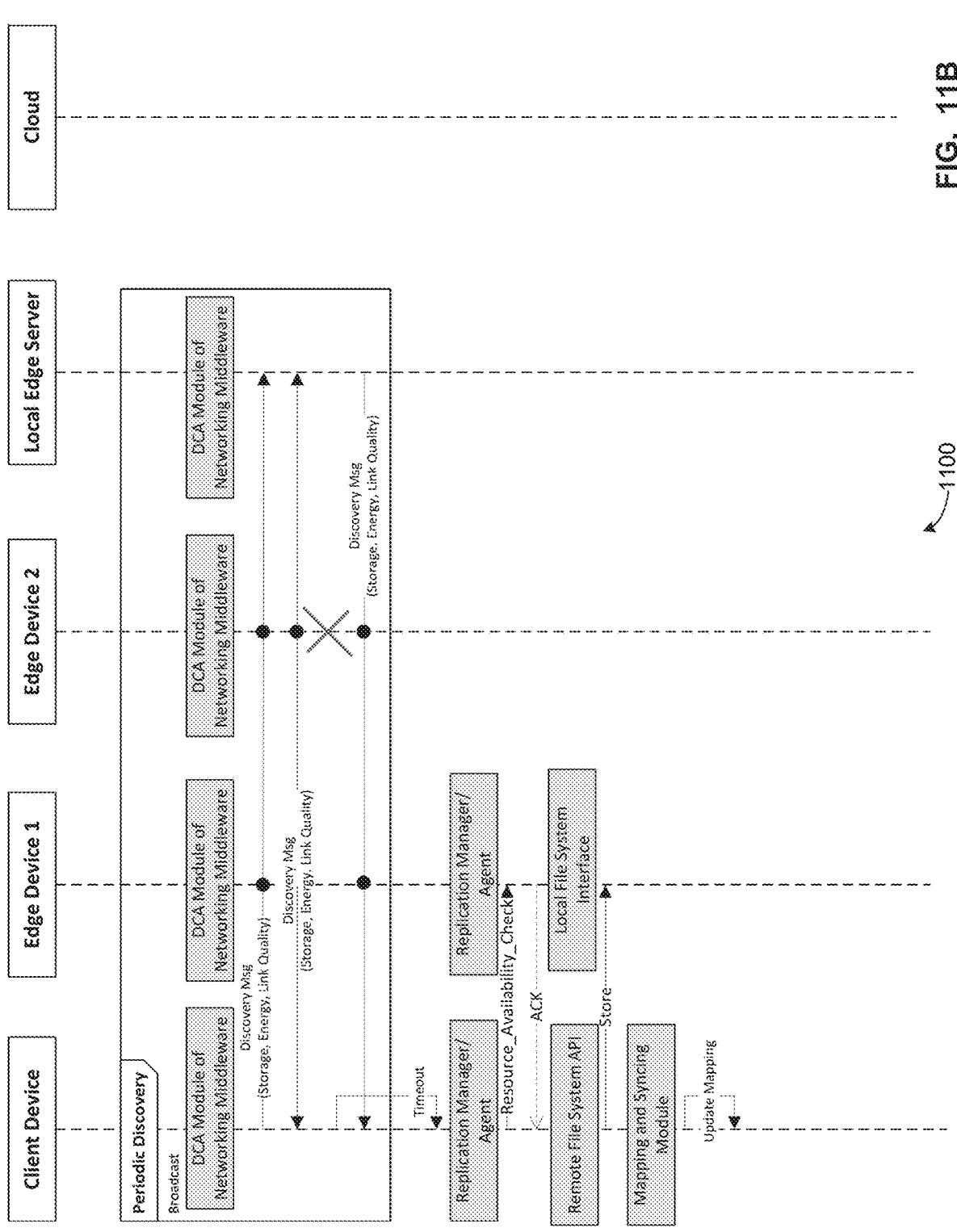

FIGS. 11A and 11B illustrate an example ping pong diagram 1100 corresponding to examples disclosed herein. Ping pong diagram of FIG. 11B continue from where the ping pong diagram of FIG. 11A end. In the example ping pong diagram 1100, the client device can correspond to the end user computing device 706 of FIG. 7, the edge device 1, the edge device 2, and/or the local edge server can correspond to the edge computing device 704 of FIG. 7, and the cloud corresponds to the cloud backend 701 of FIG. 7. The networking middleware may be the networking middleware 806 of FIGS. 8A and/or 8B. The example DCA Module may correspond to the DCA circuitry 824 of FIGS. 8A and/or 8B. The replication Manager/Agent may correspond to the 812 of FIG. 8A and/or the storage/replication agent circuitry 850 of FIG. 8B. The remote file system API corresponds to the unified file system management circuitry 800 of FIG. 8A. The local file system interface may correspond to the local file system interface 810 of FIG. 8A when implement in the edge computing device 704. The cloud storage API may correspond to the cloud storage API 860 of FIG. 8B. The mapping and syncing module may correspond to the mapping and syncing circuitry 804 of FIG. 8A.

FIGS. 11A and 11B illustrate an example interaction between a client device and multiple nearby edge devices, edge servers, and/or clouds (assuming the unified file system decides to store data on the nearby devices, edge servers, and/or clouds). Through the discovery process, the middleware may select edge device 2 as the suitable candidate for storing data. As described above, the discovered information may change due to network dynamics and varying demand. Accordingly, the client device may perform a handshake procedure with the selected edge device and server to make sure the anticipated resources are available. This procedure may not be needed for the cloud due to the seemingly unlimited storage resources of the cloud. In the next round (or for a configurable number of subsequent rounds) of discovery, if discovery messages from an edge device (edge device 2 in the figure) are not received by the client device, the middleware can trigger a procedure to replicate data to another node in order to meet the resiliency requirement. An alternative node can be selected based on the recently discovered information. With the newly selected device, the client device performs the handshake procedure before storing the data. Once storing is complete, the client device updates the mapping of the stored data (file identifier to edge device ID). In some examples (e.g., moving out of region, low energy, demand for higher priority of data), the edge device storing data can proactively send an indication to the client device, which can trigger the process of selection of an alternative storage node.

Figure 12:
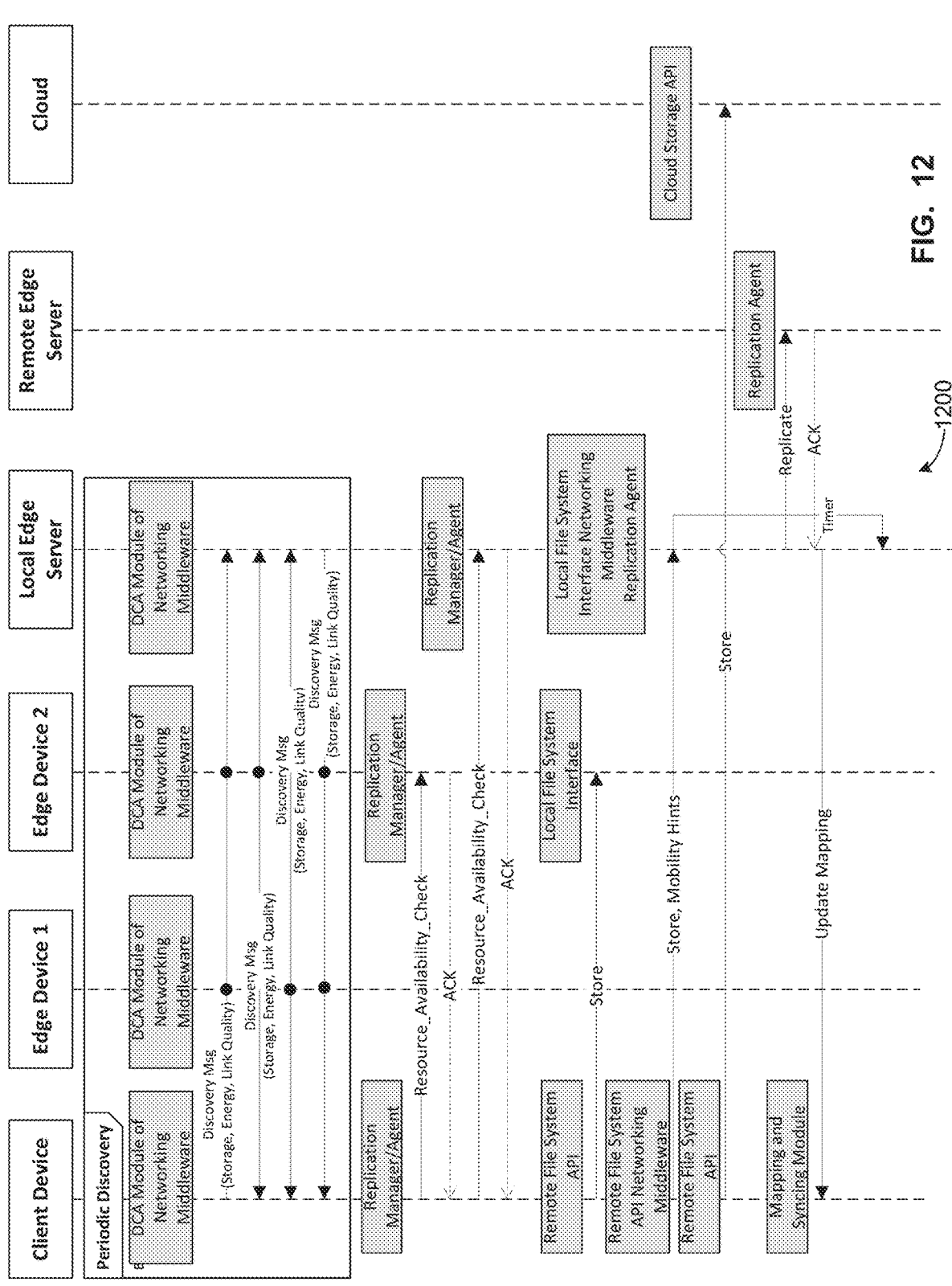
FIG. 12 illustrates an additional example ping pong diagram described in conjunction with examples disclosed herein.

FIG. 12 illustrate an example ping pong diagram 1200 corresponding to examples disclosed herein. In the example ping pong diagram 1100, the client device can correspond to the end user computing device 706 of FIG. 7, the edge device 1, the edge device 2, the local edge server, and/or the remote edge server can correspond to the edge computing device 704 of FIG. 7, and the cloud corresponds to the cloud backend 701 of FIG. 7. The networking middleware may be the networking middleware 806 of FIGS. 8A and/or 8B. The example DCA Module may correspond to the DCA circuitry 824 of FIGS. 8A and/or 8B. The replication Manager/Agent may correspond to the 812 of FIG. 8A and/or the storage/replication agent circuitry 850 of FIG. 8B. The remote file system API corresponds to the unified file system management circuitry 800 of FIG. 8A. The local file system interface may correspond to the local file system interface 810 of FIG. 8A when implement in the edge computing device 704. The cloud storage API may correspond to the cloud storage API 860 of FIG. 8B. The mapping and syncing module may correspond to the mapping and syncing circuitry 804 of FIG. 8A.

In some examples, devices may move out of the coverage of its home edge. In such examples, the client device can automatically connect to the back-end cloud for uninterrupted services. Also when the device can connect to another edge server for a reasonably long time, the system can consider use of the remote edge storage. In some examples (e.g., in intelligent transportation system), data may be produced locally in a Geo-Area (e.g., event triggered data collection after detection of an accident, high traffic congestion, etc.), stored locally (at device storage or edge storage) and used locally by consumers (road users such as vehicles, vulnerable road users, etc. in the associated Geo-area). In such examples, if a device has data stored at it (data is identified to be useful in a specific Geo-area) and the device is moving out of the Geo-area, the device can hand over the data to other peer devices and/or the edge device can be accessible with low latency by the end user devices in the Geo-area associated with the data. For example, the ping pong diagram 1200 illustrates the client device sharing hints about its mobility (e.g., trajectory plan, speed, etc.) with the current edge server. The current server can predict the time of handover and can proactively replicate data to the remote edge server before the actual handover process starts.

Figure 13A:
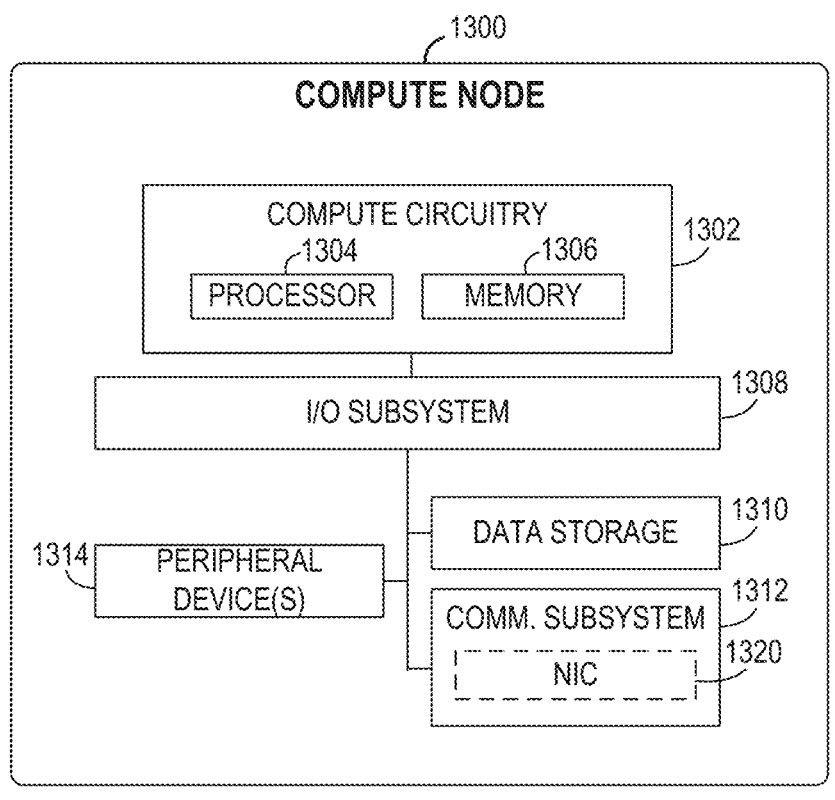
FIG. 13A is a block diagram of an example implementation of an example compute node that may be deployed in one of the edge computing systems illustrated in FIGS. 1 and/or 7.

FIG. 13A is a block diagram of an example implementation of an example edge compute node 1300 that includes a compute engine (also referred to herein as "compute circuitry") 1302, an input/output (I/O) subsystem 1308, data storage 1310, a communication circuitry subsystem 1312, and, optionally, one or more peripheral devices 1314. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1300 of FIG. 13 may be deployed in one of the edge computing systems illustrated in FIGS. 1-4 and/or 6-10 to implement any edge compute node of FIGS. 1-4 and/or 6-10.

The example compute node 1300 may be embodied as any type of engine, device, or collection of devices capable of performing various compute functions. In some examples, the compute node 1300 may be embodied as a single device such as an integrated circuit, an embedded system, a field-programmable gate array (FPGA), a system-on-a-chip (SOC), or other integrated system or device. In the illustrative example, the compute node 1300 includes or is embodied as a processor 1304 and a memory 1306. The example processor 1304 may be embodied as any type of processor capable of performing the functions described herein (e.g., executing an application). For example, the processor 1304 may be embodied as a multi-core processor(s), a microcontroller, a processing unit, a specialized or special purpose processing unit, or other processor or processing/controlling circuit.

In some examples, the processor 1304 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1304 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1304 may work in coordination with each other to execute many types of operations and instructions within and on behalf of the compute node 1300. In some examples, processor circuitry (e.g., the processor 1304) may instantiate instructions by configuring portion(s) of the processor circuitry to execute operation(s) that correspond to the instructions. In some examples, processor circuitry may instantiate instructions by execution operation(s) that correspond to the instructions. In some examples, processor circuitry that implements a network device (e.g., a network interface card (NIC), a smart NIC, interface circuitry, an Infrastructure Processing Unit (IPU), etc.) may instantiate instructions by executing a first partial operation, a first portion of one or more operations, etc., with a second partial operation, a second portion of the one or more operations, etc., to be executed at a different time. In some such examples, the processor circuitry may not complete the one or more operations in full to instantiate the instructions.

The example memory 1306 may be embodied as any type of volatile (e.g., dynamic random access memory (DRAM), etc.) or nonvolatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device 1306 is a block addressable memory device, such as those based on NAND or NOR technologies. A memory device 1306 may also include a three dimensional crosspoint memory device (e.g., Intel® 3D XPoint™ memory), or other byte addressable write-in-place nonvolatile memory devices. The memory device 1306 may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1306 may be integrated into the processor 1304. The memory 1306 may store various software and data used during operation such as one or more applications, data operated on by the application(s), libraries, and drivers.

The example compute circuitry 1302 is communicatively coupled to other components of the compute node 1300 via the I/O subsystem 1308, which may be embodied as circuitry and/or components to facilitate input/output operations with the compute circuitry 1302 (e.g., with the processor 1304 and/or the main memory 1306) and other components of the compute circuitry 1302. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1308 may form a portion of a system-on-a-chip (SoC) and be incorporated, along with one or more of the processor 1304, the memory 1306, and other components of the compute circuitry 1302, into the compute circuitry 1302.

The one or more illustrative data storage devices 1310 may be embodied as any type of devices configured for short-term or long-term storage of data such as, for example, memory devices and circuits, memory cards, hard disk drives, solid-state drives, or other data storage devices. Individual data storage devices 1310 may include a system partition that stores data and firmware code for the data storage device 1310. Individual data storage devices 1310 may also include one or more operating system partitions that store data files and executables for operating systems depending on, for example, the type of compute node 1300.

The example communication circuitry 1312 may be embodied as any communication circuit, device, or collection thereof, capable of enabling communications over a network between the compute circuitry 1302 and another compute device (e.g., an edge gateway of an implementing edge computing system). The example communication circuitry 1312 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LP-WAN) or low-power wide-area (LPWA) protocols, etc.) to effect such communication.

The illustrative communication circuitry 1312 includes a network interface controller (NIC) 1320, which may also be referred to as a host fabric interface (HFI). The example NIC 1320 may be embodied as one or more add-in-boards, daughter cards, network interface cards, controller chips, chipsets, or other devices that may be used by the compute node 1300 to connect with another compute device (e.g., an edge gateway node). In some examples, the NIC 1320 may be embodied as part of a system-on-a-chip (SoC) that includes one or more processors, or included on a multichip package that also contains one or more processors. In some examples, the NIC 1320 may include a local processor (not shown) and/or a local memory (not shown) that are both local to the NIC 1320. In such examples, the local processor of the NIC 1320 may be capable of performing one or more of the functions of the compute circuitry 1302 described herein. Additionally, or alternatively, in such examples, the local memory of the NIC 1320 may be integrated into one or more components of the client compute node at the board level, socket level, chip level, and/or other levels.

Additionally, in some examples, a respective compute node 1300 may include one or more peripheral devices 1314. Such peripheral devices 1314 may include any type of peripheral device found in a compute device or server such as audio input devices, a display, other input/output devices, interface devices, and/or other peripheral devices, depending on the particular type of the compute node 1300. In further examples, the compute node 1300 may be embodied by a respective edge compute node (whether a client, gateway, or aggregation node) in an edge computing system or like forms of appliances, computers, subsystems, circuitry, or other components.

Figure 13B:
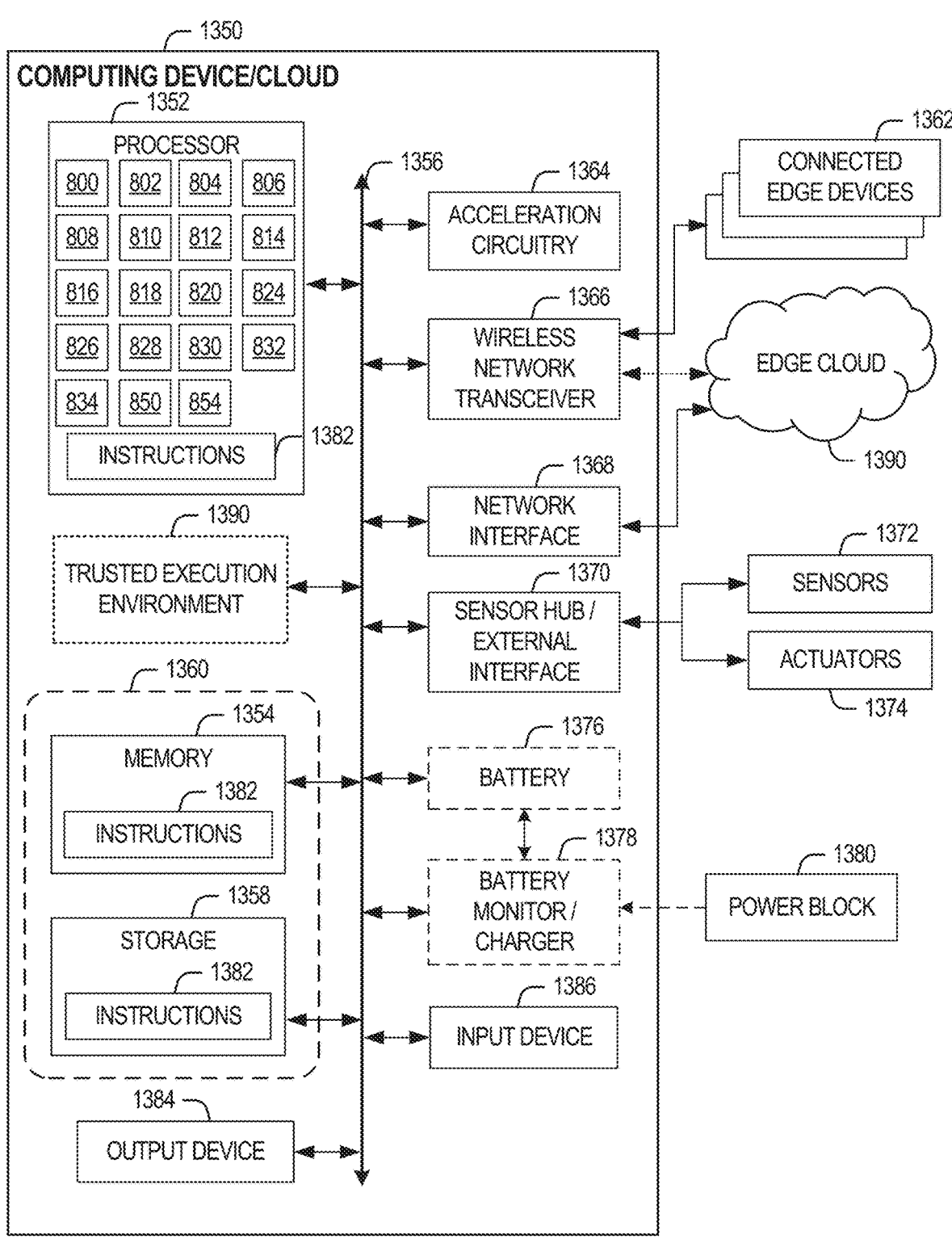
FIG. 13B is a block diagram of an example processor platform structured to execute the instructions of FIGS. 9-10 to implement the end user computing device and/or the edge computing device of FIGS. 7, 8A and/or 8B.

In a more detailed example, FIG. 13B illustrates a block diagram of an example may computing device 1350 structured to execute the instructions of FIGS. 9 and/or 10 to implement the techniques (e.g., operations, processes, methods, and methodologies) described herein such as the end user computing device 706 and/or the edge computing device 704 of FIG. 7. This computing device 1350 provides a closer view of the respective components of node 1300 when implemented as or as part of a computing device (e.g., as a mobile device, a base station, server, gateway, etc.). The computing device 1350 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing device 1350, or as components otherwise incorporated within a chassis of a larger system. For example, the computing device 1350 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The computing device 1350 may include processing circuitry in the form of a processor 1352, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1352 may be a part of a system on a chip (SoC) in which the processor 1352 and other components are formed into a single integrated circuit, or a single package, such as the Edison™ or Galileo™ SoC boards from Intel Corporation, Santa Clara, California As an example, the processor 1352 may include an Intel® Architecture Core™ based CPU processor, such as a Quark™, an Atom™, an i3, an i5, an i14, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1352 and accompanying circuitry may be provided in a single socket form factor, multiple socket form factor, or a variety of other formats, including in limited hardware configurations or configurations that include fewer than all elements shown in FIG. 13B. In this example, the processor implements at least one of the unified file system management circuitry 800, the example caching and prefetching circuitry 802, the example mapping and synching circuitry 804, the example networking middleware 806, the example remote file system interface 808, the example local file system interface 810, the example automatic replication manager/agent circuitry 812, the example cache circuitry 814, the example prefetching circuitry 816, the example sync schedule circuitry 818, the example compression circuitry 820, the example DCA circuitry 824, the example traffic prioritization circuitry 826, the example connection loss predictor circuitry 828, the example packet duplication circuitry 830, the example mobility hint handler circuitry 832, the example radio access selection 834, the example storage/replication agent circuitry 850, and/or the example network interface 854.

The processor 1352 may communicate with a system memory 1354 over an interconnect 1356 (e.g., a bus). Any number of memory devices may be used to provide for a given amount of system memory. As examples, the memory 1354 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD149F for DDR SDRAM, JESD149-2F for DDR2 SDRAM, JESD149-3F for DDR3 SDRAM, JESD149-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q114P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDMMs.

To provide for persistent storage of information such as data, applications, operating systems and so forth, a storage 1358 may also couple to the processor 1352 via the interconnect 1356. In an example, the storage 1358 may be implemented via a solid-state disk drive (SSDD). Other devices that may be used for the storage 1358 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others. The example memory 1354, the example storage 1358 and/or any other memory or storage may implement device storage 712, the edge storage 710, the cloud storage 708, the example map storage 822, the example resource database 836, the example resource database 854 of FIGS. 7-8B.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1356 may couple the processor 1352 to a transceiver 1366, for communications with the connected edge devices 1362. The transceiver 1366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1366 (or multiple transceivers) may communicate using multiple standards or radios for communications at a different range. For example, the computing device 1350 may communicate with close devices, e.g., within about 10 meters, using a local transceiver based on Bluetooth Low Energy (BLE), or another low power radio, to save power. More distant connected edge devices 1362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1366 (e.g., a radio transceiver) may be included to communicate with devices or services in the edge cloud 1395 via local or wide area network protocols. The wireless network transceiver 1366 may be a low-power wide-area (LPWA) transceiver that follows the IEEE 802.15.4, or IEEE 802.15.4g standards, among others. The computing device 1350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1366, as described herein. For example, the transceiver 1366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1368 may be included to provide a wired communication to nodes of the edge cloud 1395 or to other devices, such as the connected edge devices 1362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, etc.) may be embodied by such communications circuitry.

The computing device 1350 may include or be coupled to acceleration circuitry 1364, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1356 may couple the processor 1352 to a sensor hub or external interface 1370 that is used to connect additional devices or subsystems. The devices may include sensors 1372, such as accelerometers, level sensors, flow sensors, optical light sensors, camera sensors, temperature sensors, global navigation system (e.g., GPS) sensors, pressure sensors, barometric pressure sensors, and the like. The hub or interface 1370 further may be used to connect the computing device 1350 to actuators 1374, such as power switches, valve actuators, an audible sound generator, a visual warning device, and the like.

In some optional examples, various input/output (I/O) devices may be present within or connected to, the computing device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing device 1350. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the computing device 1350, although, in examples in which the computing device 1350 is mounted in a fixed location, it may have a power supply coupled to an electrical grid, or the battery may be used as a backup or for temporary capabilities. The battery 1376 may be a lithium ion battery, or a metal-air battery, such as a zinc-air battery, an aluminum-air battery, a lithium-air battery, and the like.

A battery monitor/charger 1378 may be included in the computing device 1350 to track the state of charge (SoCh) of the battery 1376, if included. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, Texas. The battery monitor/charger 1378 may communicate the information on the battery 1376 to the processor 1352 over the interconnect 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the computing device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the computing device 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine-readable medium 1360 including code to direct the processor 1352 to perform electronic operations in the computing device 1350. The processor 1352 may access the non-transitory, machine-readable medium 1360 over the interconnect 1356. For instance, the non-transitory, machine-readable medium 1360 may be embodied by devices described for the storage 1358 or may include specific storage units such as optical disks, flash drives, or any number of other hardware devices. The non-transitory, machine-readable medium 1360 may include instructions to direct the processor 1352 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1382 on the processor 1352 (separately, or in combination with the instructions 1382 of the machine readable medium 1360) may configure execution or operation of a trusted execution environment (TEE) 1390. In an example, the TEE 1390 operates as a protected area accessible to the processor 1352 for secure execution of instructions and secure access to data. Various implementations of the TEE 1390, and an accompanying secure area in the processor 1352 or the memory 1354 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1350 through the TEE 1390 and the processor 1352. As described above, the TEE 1390 may process privacy sensitive telemetry data (e.g., AI inference over telemetry data). In such examples, the TEE 1390 may ensure that the various interests (e.g., conditions) are met as a condition of acceptance and/or disclosure of the telemetry data.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 900 and 1000 of FIGS. 9 and/or 10 may be stored in the memory 1354, the storage 1358, and/or on a removable non-transitory computer readable storage medium such as a CD or DVD.

Figure 14:
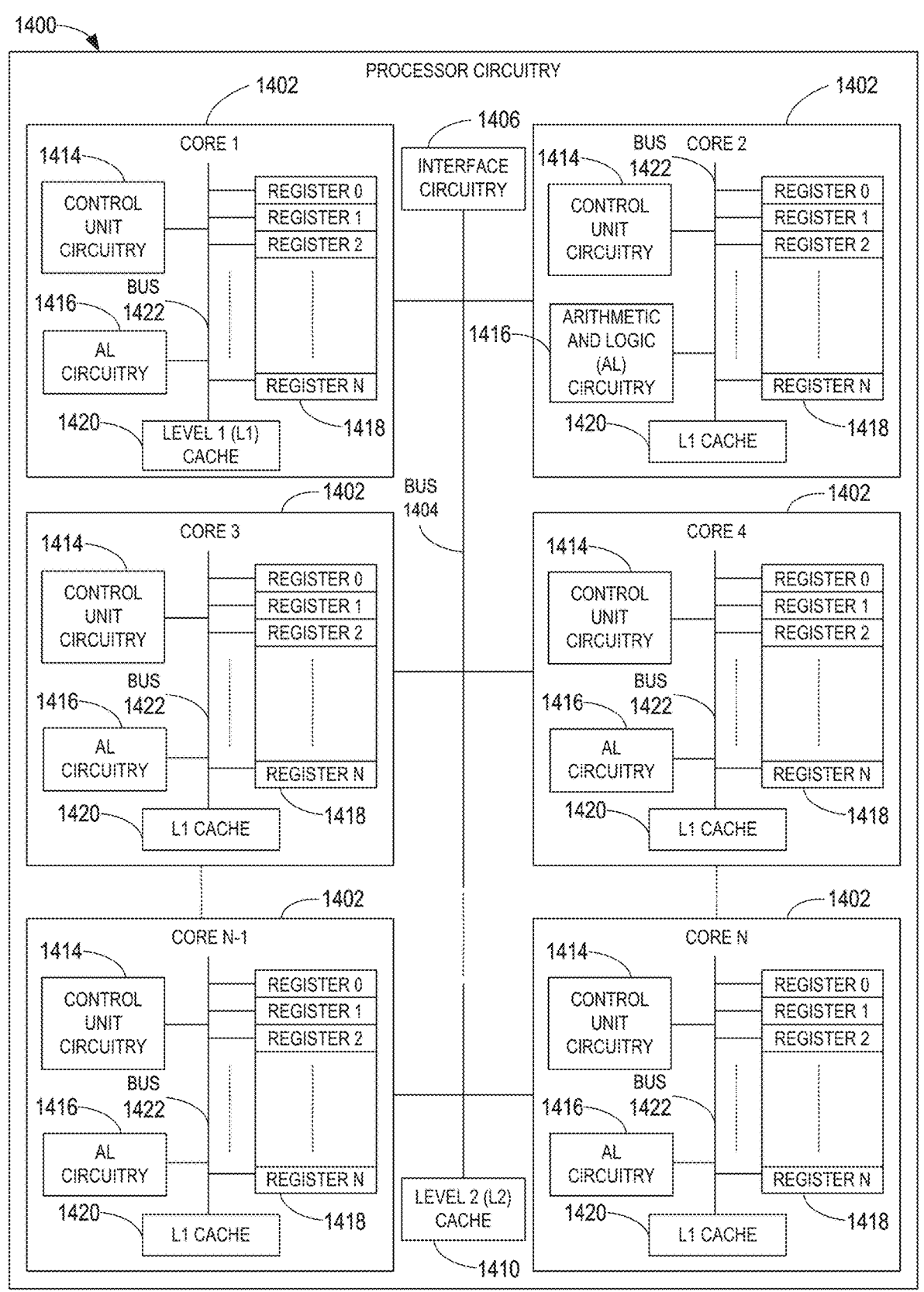
FIG. 14 is a block diagram of an example implementation of the processor circuitry of FIG. 13B.

FIG. 14 is a block diagram of an example implementation of the processor circuitry 1352 of FIG. 13B. In this example, the processor circuitry 1352 of FIG. 13B is implemented by a microprocessor 1400. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIG. 9-10.

The cores 1402 may communicate by an example bus 1404. In some examples, the bus 1404 may implement a communication bus to effectuate communication associated with one(s) of the cores 1402. For example, the bus 1404 may implement at least one of an Inter-Integrated Circuit (I2C) bus, a Serial Peripheral Interface (SPI) bus, a PCI bus, or a PCIe bus. Additionally or alternatively, the bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1354, 1358 of FIG. 13B). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and an example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 16 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 13B. Alternatively, the registers 1418 may be organized in any other arrangement, format, or structure including distributed throughout the core 1402 to shorten access time. The bus 1420 may implement at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
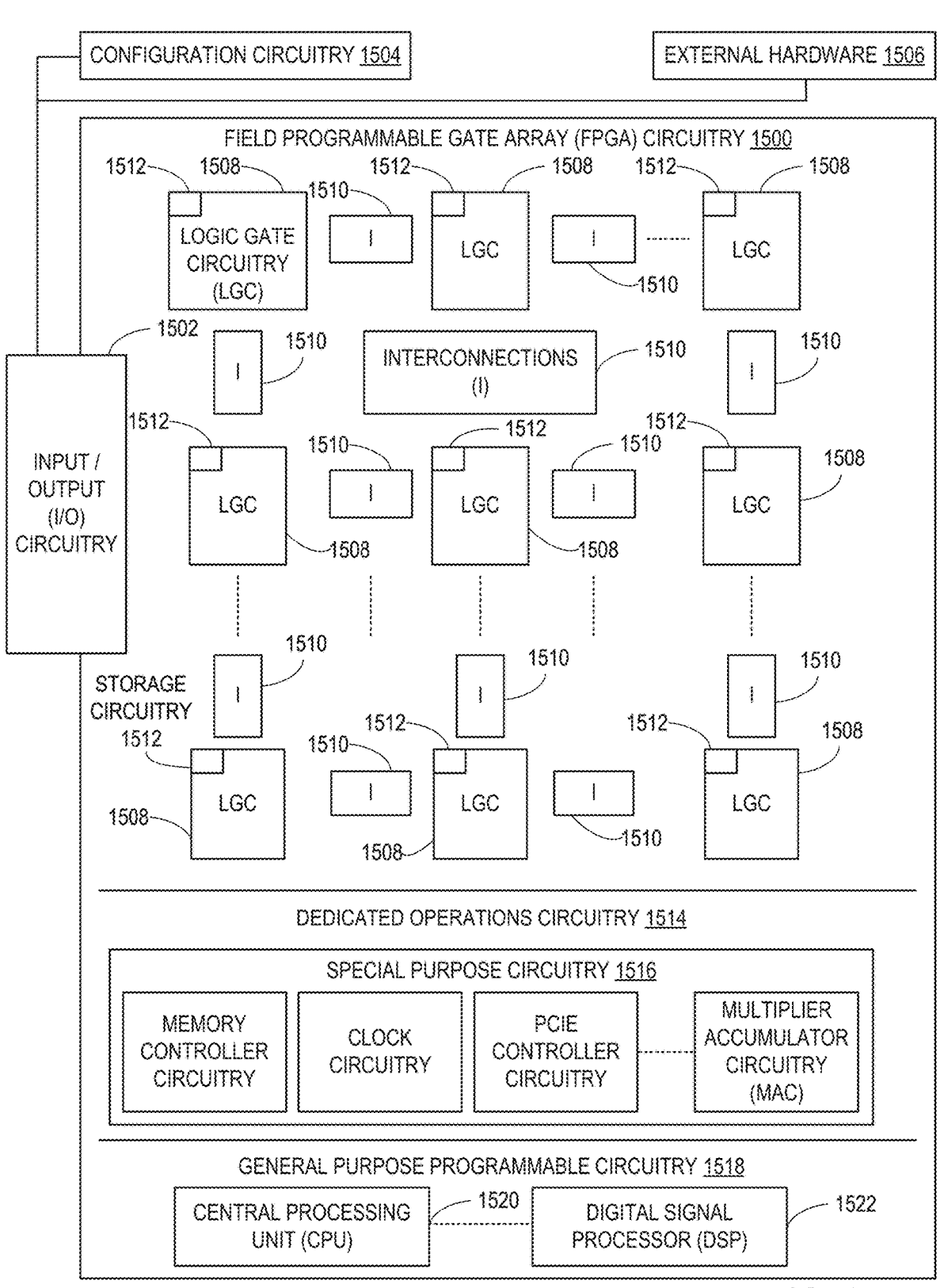
FIG. 15 is a block diagram of another example implementation of the processor circuitry of FIG. 13B.

FIG. 15 is a block diagram of another example implementation of the processor circuitry 1362 of FIG. 13B. In this example, the processor circuitry 1362 is implemented by FPGA circuitry 1500. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 9-10 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 9-10. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 9-10. As such, the FPGA circuitry 1500 may be structured to effectively instantiate some or all of the machine readable instructions of the flowcharts of FIGS. 9-10 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 15 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIG. 15 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1352 of FIG. 14, many other approaches are contemplated. For example, as mentioned above, modern FPGA circuitry may include an onboard CPU, such as one or more of the example CPU 1520 of FIG. 15. Therefore, the processor circuitry 1352 of FIG. 13B may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 9-10 may be executed by one or more of the cores 1402 of FIG. 14 and a second portion of the machine readable instructions represented by the flowcharts of FIGS. 9-10 may be executed by the FPGA circuitry 1500 of FIG. 15.

In some examples, the processor circuitry 1352 of FIG. 13B may be in one or more packages. For example, the processor circuitry 1400 of FIG. 14 and/or the FPGA circuitry 1500 of FIG. 15 may be in one or more packages. In some examples, an XPU may be implemented by the processor circuitry 1352 of FIG. 13B, which may be in one or more packages. For example, the XPU may include a CPU in one package, a DSP in another package, a GPU in yet another package, and an FPGA in still yet another package.

Figure 16:
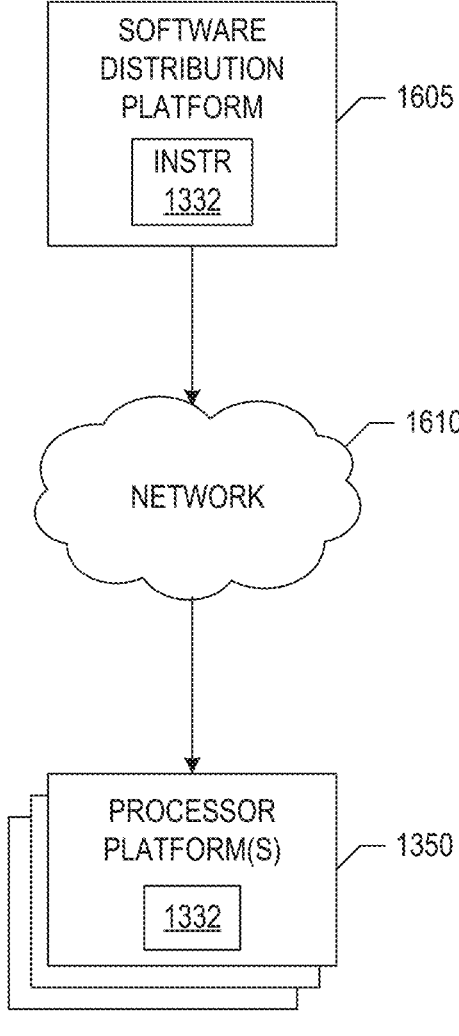
FIG. 16 is a block diagram of an example software distribution platform (e.g., one or more servers) to distribute software (e.g., software corresponding to the example machine readable instructions of FIGS. 9-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1382 of FIG. 13B to hardware devices owned and/or operated by third parties is illustrated in FIG. 16 The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1382 of FIG. 13B. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1382, which may correspond to the example machine readable instructions 1382 of FIGS. 9-10, as described above. The one or more servers of the example software distribution platform 1605 are in communication with a network 1610, which may correspond to any one or more of the Internet and/or any of the example network 702 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1382 from the software distribution platform 1605. For example, the software, which may correspond to the example machine readable instructions 900, 1000 of FIGS. 9 and/or 10, may be downloaded to the example processor platform 1352, which is to execute the machine readable instructions 1382 to implement the end user computing device 706 and/or the edge computing device 704 of FIGS. 8A and/or 8B. In some example, one or more servers of the software distribution platform 1605 periodically offer, transmit, and/or force updates to the software (e.g., the example machine readable instructions 1382 of FIG. 13B) to ensure improvements, patches, updates, etc., are distributed and applied to the software at the end user devices.

Example methods, apparatus, systems, and articles of manufacture providing a tiered elastic cloud storage to increase data resiliency are disclosed herein. Further examples and combinations thereof include the following:

Example 1 includes a non-transitory computer readable storage medium comprising instructions which, when executed, cause one or more processors to at least generate a storage scheme for files based on a categorization of the files and resource capabilities of an edge-based device and a cloud-based device, the categorization including a first group of files to be stored locally at an end user computing device, a second group of files to be stored externally at the edge-based device, and a third group of files to be stored externally at the cloud-based device, in response to an acknowledgement from at least one of the edge-based device or the cloud-based device, generate a map corresponding to locations of the files, store the first group of files in local storage, and cause transmission of the second group of files to the edge-based device and the third group of files to the cloud-based device.

Example 2 includes the computer readable storage medium of example 1, wherein the edge-based device is a first edge-based device, the instructions to cause the one or more processors to, in response to determining that the edge-based device is unavailable after receiving the acknowledgement from the edge-based device, transmit the second group of files to a second edge-based device.

Example 3 includes the computer readable storage medium of example 2, wherein the instructions cause the one or more processors to update the map after transmitting the second group files to the second edge-based device.

Example 4 includes the computer readable storage medium of example 1, wherein the instructions cause the one or more processors to cause transmission of a discovery message to at least one of the edge-based device or the cloud-based device, the resource capabilities determined based on a response to the discovery message.

Example 5 includes the computer readable storage medium of example 1, wherein the instructions cause the one or more processors to transmit mobility information to the edge-based device, the mobility information including at least one of a location, a speed, or a direction.

Example 6 includes the computer readable storage medium of example 5, wherein the edge-based device storing the second group of files transmits the second group of files to a second edge-based device based on the mobility information.

Example 7 includes the computer readable storage medium of example 1, wherein the instructions cause the one or more processors to determine a probability that a communication loss will occur with the edge-based device.

Example 8 includes the computer readable storage medium of example 7, wherein the edge-based device is a first edge-based device, the instructions to cause the one or more processors to switch to an alternative communication path to avoid the communication loss when the probability is above a threshold.

Example 9 includes the computer readable storage medium of example 1, wherein the instructions cause the one or more processors to evict data from the local storage based on at least one of access recency, access frequency, file size, application context information, or attributes of the data.

Example 10 includes the computer readable storage medium of example 1, wherein the resource capabilities of the edge-based device and the cloud-based device is based on at least one of workload characteristics or a service level agreement.

Example 11 includes the computer readable storage medium of example 1, wherein the instructions cause the one or more processors to include historical data in the map, the historical data corresponding to access of the files.

Example 12 includes the computer readable storage medium of example 11, wherein the instructions cause the one or more processors to at least one of evict a first file of the first group of files from the local storage based on the historical data or prefetch a second file from at least one of the second group of files or the third group of files based on the historical data.

Example 13 includes the computer readable storage medium of example 1, wherein the map is stored in the local storage to be used as a template for a subsequent session.

Example 14 includes an apparatus to externally store data, the apparatus comprising at least one memory, instructions in the apparatus, and processor circuitry to at least one of execute and/or instantiate the instructions to generate a storage scheme for files based on a categorization of the files and resource capabilities of an edge-based device and a cloud-based device, the categorization including a first group of files to be stored locally at an end user computing device, a second group of files to be stored externally at the edge-based device, and a third group of files to be stored externally at the cloud-based device, in response to an acknowledgement from at least one of the edge-based device or the cloud-based device, generate a map corresponding to locations of the files, store the first group of files in local storage, and cause transmission of the second group of files to the edge-based device and the third group of files to the cloud-based device.

Example 15 includes the apparatus of example 14, wherein the edge-based device is a first edge-based device, the processor circuitry to, in response to determining that the edge-based device is unavailable after receiving the acknowledgement from the edge-based device, transmit the second group of files to a second edge-based device.

Example 16 includes the apparatus of example 15, wherein the processor circuitry is to update the map after transmitting the second group files to the second edge-based device.

Example 17 includes the apparatus of example 14, wherein the processor circuitry is to cause transmission of a discovery message to at least one of the edge-based device or the cloud-based device, the resource capabilities determined based on a response to the discovery message.

Example 18 includes the apparatus of example 14, wherein the processor circuitry is to transmit mobility information to the edge-based device, the mobility information including at least one of a location, a speed, or a direction.

Example 19 includes the apparatus of example 18, wherein the edge-based device storing the second group of files transmits the second group of files to a second edge-based device based on the mobility information.

Example 20 includes the apparatus of example 14, wherein the processor circuitry is to determine a probability that a communication loss will occur with the edge-based device.

Example 21 includes the apparatus of example 20, wherein the edge-based device is a first edge-based device, the processor circuitry to switch to an alternative communication path to avoid the communication loss when the probability is above a threshold.

Example 22 includes the apparatus of example 14, wherein the processor circuitry is to evict data from the local storage based on at least one of access recency, access frequency, file size, application context information, or attributes of the data.

Example 23 includes the apparatus of example 14, wherein the resource capabilities of the edge-based device and the cloud-based device is based on at least one of workload characteristics or a service level agreement.

Example 24 includes the apparatus of example 14, wherein the processor circuitry is to include historical data in the map, the historical data corresponding to access of the files.

Example 25 includes a method to externally store data, the method comprising generating, by executing an instruction with a processor, a storage scheme for files based on a categorization of the files and resource capabilities of an edge-based device and a cloud-based device, the categorization including a first group of files to be stored locally at an end user computing device, a second group of files to be stored externally at the edge-based device, and a third group of files to be stored externally at the cloud-based device, in response to an acknowledgement from at least one of the edge-based device or the cloud-based device, generating, by executing an instruction with the processor, a map corresponding to locations of the files, storing the first group of files in local storage, and causing transmission of the second group of files to the edge-based device and the third group of files to the cloud-based device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions to cause one or more processor circuits to at least:

cause transmission of discovery messages to a network to collect information describing available storage resources in the network, capacities of the storage resources, and characteristics of communication links associated with the storage resources, the network including a user device, a first edge-based device, a second edge-based device, and at least one cloud-based device;

monitor access patterns of files to be stored across the storage resources;

process the information and the access patterns to generate a storage map, the storage map to identify a first group of files to be stored locally at the user device, a second group of files to be stored externally at at least one of the first edge-based device or the second edge-based device, and a third group of files to be stored externally at the at least one cloud-based device;

cause storage of the first group of files in local storage of the user device according to the storage map;

after collecting the information, verify whether the first edge-based device is available;

based on unavailability of the first edge-based device, cause transmission of the second group of files to the second edge-based device; and cause transmission of the third group of files to the at least one cloud-based device according to the storage map.

2. The computer readable storage medium of claim 1, wherein the storage map indicates that the second group of files is to be stored at the first edge-based device, and the instructions are to cause at least one of the one or more processor circuits to update the storage map after transmission of the second group of files to the second edge-based device.

3. The computer readable storage medium of claim 1, wherein the discovery messages include a first discovery message, and the instructions are to cause at least one of the one or more processor circuits to cause transmission of the first discovery message to at least one of the first edge-based device, the second edge-based device, or the at least one cloud-based device, the information determined based on a response to the first discovery message, the response from at least one of the first edge-based device, the second edge-based device, or the at least one cloud-based device.

4. The computer readable storage medium of claim 1, wherein the instructions are to cause at least one of the one or more processor circuits to cause transmission of mobility information to at least one of the first edge-based device or the second edge-based device, the mobility information including at least one of a location, a speed, or a direction of the user device.

5. The computer readable storage medium of claim 1, wherein the network includes a third edge-based device, and the instructions are to cause at least one of the one or more processor circuits to cause transmission of mobility information to the second edge-based device, the mobility information to cause the second edge-based device to transmit the second group of files to the third edge-based device.

6. The computer readable storage medium of claim 1, wherein the instructions are to cause at least one of the one or more processor circuits to determine a probability that a communication loss will occur with the second edge-based device.

7. The computer readable storage medium of claim 6, wherein the instructions are to cause at least one of the one or more processor circuits to switch to an alternative communication path to avoid the communication loss based on the probability.

8. The computer readable storage medium of claim 1, wherein the access patterns include at least one of access recency, access frequency, file size, application context information, or attributes of the files, and the instructions are to cause at least one of the one or more processor circuits to evict one or more files from the local storage based on the access patterns.

9. The computer readable storage medium of claim 1, wherein the information is based on at least one of workload characteristics or service level agreements of the first edge-based device, the second edge-based device, and the at least one cloud-based device.

10. The computer readable storage medium of claim 1, wherein the access patterns include historical data corresponding to access of the files.

11. The computer readable storage medium of claim 10, wherein the instructions are to cause at least one of the one or more processor circuits to at least one of (a) evict a first file of the first group of files from the local storage based on the historical data or (b) prefetch a second file from at least one of the second group of files or the third group of files based on the historical data.

12. The computer readable storage medium of claim 1, wherein the instructions are to cause at least one of the one or more processor circuits to cause storage of the storage map in the local storage, the storage map to be used as a template for a subsequent session.

13. An apparatus comprising:

at least one memory;

instructions in the apparatus; and one or more processor circuits to at least one of execute and/or instantiate the instructions to:

cause transmission of discovery messages to a network to collect information describing available storage resources in the network, capacities of the storage resources, and characteristics of communication links associated with the storage resources, the network including a user device, a first edge-based device, a second edge-based device, and at least one cloud-based device;

monitor access patterns of files to be stored across the storage resources;

process the information and the access patterns to generate a storage map, the storage map to identify a first group of files to be stored locally at the user device, a second group of files to be stored externally at at least one of the first edge-based device or the second edge-based device, and a third group of files to be stored externally at the at least one cloud-based device;

cause storage of the first group of files in local storage of the user device according to the storage map;

after collecting the information, verify whether the first edge-based device is available;

based on unavailability of the first edge-based device, cause transmission of the second group of files to the second edge-based device; and cause transmission of the third group of files to the at least one cloud-based device according to the storage map.

14. The apparatus of claim 13, wherein the storage map indicates that the second group of files is to be stored at the first edge-based device, and at least one of the one or more processor circuits is to update the storage map after transmission of the second group of files to the second edge-based device.

15. The apparatus of claim 13, wherein the discovery messages include a first discovery message, and at least one of the one or more processor circuits is to cause transmission of the first discovery message to at least one of the first edge-based device, the second edge-based device, or the at least one cloud-based device, the information determined based on a response to the first discovery message, the response from at least one of the first edge-based device, the second edge-based device, or the at least one cloud-based device.

16. The apparatus of claim 13, wherein at least one of the one or more processor circuits is to cause transmission of mobility information to at least one of the first edge-based device or the second edge-based device, the mobility information including at least one of a location, a speed, or a direction of the user device.

17. The apparatus of claim 13, wherein the network includes a third edge-based device, and at least one of the one or more processor circuits is to cause transmission of mobility information to the second edge-based device, the mobility information to cause the second edge-based device to transmit the second group of files to the third edge-based device.

18. The apparatus of claim 13, wherein at least one of the one or more processor circuits is to determine a probability that a communication loss will occur with the second edge-based device.

19. The apparatus of claim 18, wherein at least one of the one or more processor circuits is to switch to an alternative communication path to avoid the communication loss based on the probability.

20. The apparatus of claim 13, wherein the access patterns include at least one of access recency, access frequency, file size, application context information, or attributes of the files, and at least one of the one or more processor circuits is to evict one or more files from the local storage based on the access patterns.

21. The apparatus of claim 13, wherein the information is based on at least one of workload characteristics or service level agreements of the first edge-based device, the second edge-based device, and the at least one cloud-based device.

22. The apparatus of claim 13, wherein the access patterns include historical data corresponding to access of the files.

23. A method comprising:

transmitting discovery messages to a network to collect information describing available storage resources in the network, capacities of the storage resources, and characteristics of communication links associated with the storage resources, the network including a user device, a first edge-based device, a second edge-based device, and at least one cloud-based device;

monitoring access patterns of files to be stored across the storage resources;

processing, by executing an instruction with one or more processor circuits, the information and the access patterns to generate a storage map, the storage map to identify a first group of files to be stored locally at the user device, a second group of files to be stored externally at at least one of the first edge-based device or the second edge-based device, and a third group of files to be stored externally at the at least one cloud-based device;

storing the first group of files in local storage of the user device according to the storage map;

after collecting the information, verifying whether the first edge-based device is available;

based on unavailability of the first edge-based device, transmitting the second group of files to the second edge-based device; and transmitting the third group of files to the at least one cloud-based device according to the storage map.

* * * * *